(12) United States Patent
Zhou et al.

(10) Patent No.: US 9,281,738 B2
(45) Date of Patent: Mar. 8, 2016

(54) POWER CONVERSION APPARATUS WITH LOW COMMON MODE NOISE AND APPLICATION SYSTEMS THEREOF

(71) Applicant: DELTA ELECTRONICS, INC., Taoyuan Hsien (TW)

(72) Inventors: Jinping Zhou, Taoyuan Hsien (TW); Min Zhou, Taoyuan Hsien (TW); Yicong Xie, Taoyuan Hsien (TW)

(73) Assignee: DELTA ELECTRONICS, INC., Taiwan (CN)

( * ) Notice: Subject to any disclaimer, the term of this patent is extended or adjusted under 35 U.S.C. 154(b) by 323 days.

(21) Appl. No.: 13/840,188

(22) Filed: Mar. 15, 2013

(65) Prior Publication Data

US 2014/0140112 A1    May 22, 2014

(30) Foreign Application Priority Data

Nov. 16, 2012  (CN) .......................... 2012 1 0464340

(51) Int. Cl.
*H02M 1/12* (2006.01)
*H02M 5/458* (2006.01)
*H02M 7/217* (2006.01)
*H02M 7/5387* (2007.01)

(52) U.S. Cl.
CPC ................ *H02M 1/126* (2013.01); *H02M 1/12* (2013.01); *H02M 5/4585* (2013.01); *H02M 7/217* (2013.01); *H02M 7/5387* (2013.01)

(58) Field of Classification Search
CPC . H02M 1/126; H02M 1/12; H02M 2001/123; H02M 2001/0064; H02M 1/43; H02M 7/217; H02M 7/5387; H02M 5/4585

USPC .............................. 363/39, 37, 40, 44, 47, 48
See application file for complete search history.

(56) References Cited

U.S. PATENT DOCUMENTS 5,499,178 A * 3/1996 Mohan ............................ 363/39
5,719,757 A * 2/1998 Beyerlein ............ H02M 1/4216
                                                                 323/211

(Continued)

FOREIGN PATENT DOCUMENTS

CN          101834540 A       9/2010
CN          102244459 A       11/2011

OTHER PUBLICATIONS

Office Action issued Nov. 3, 2015 by the CN Office.

*Primary Examiner* — Fred E Finch, III
*Assistant Examiner* — Gustavo Rosario Benitez
(74) *Attorney, Agent, or Firm* — Yunling Ren; Eaton & Van Winkle

(57) ABSTRACT

A power conversion circuit comprises an AC source, a power conversion unit, a filter inductor unit and a common mode noise suppression circuit. The power conversion unit has DC terminals and AC terminals. The filter inductor unit has first and second terminals, being respectively connected to the AC source and the AC terminals of the power conversion unit. The common mode noise suppression circuit has a capacitive impedance network with first and second terminals, and an impedance balancing network with first and second terminals. The second terminals of the capacitive impedance network are connected to the first terminals of the impedance balancing network, the first terminals of the capacitive impedance network are connected to the first terminals of the filter inductor unit, and the second terminals of the impedance balancing network are connected to the DC terminals of the power conversion unit.

16 Claims, 21 Drawing Sheets

(56) References Cited

U.S. PATENT DOCUMENTS

| | | | | |
|---|---|---|---|---|
| 5,852,558 A * | 12/1998 | Julian | | H02M 7/5387 363/132 |
| 2009/0195303 A1 * | 8/2009 | Bowhers | | H02M 7/48 327/551 |
| 2011/0266988 A1 * | 11/2011 | Inuduka et al. | | 318/400.25 |
| 2012/0106210 A1 * | 5/2012 | Xu et al. | | 363/37 |
| 2013/0099571 A1 * | 4/2013 | Bremicker | | H02M 1/32 307/43 |
| 2013/0141182 A1 * | 6/2013 | Beyerlein | | H03H 21/0007 333/17.2 |
| 2013/0194838 A1 * | 8/2013 | Jang | | H02M 1/4216 363/37 |

* cited by examiner

POWER CONVERSION APPARATUS WITH LOW COMMON MODE NOISE AND APPLICATION SYSTEMS THEREOF

CROSS-REFERENCE TO RELATED APPLICATIONS

The present application claims priority under 35 U.S.C. §119 to Chinese Patent Application No. 201210464340, filed on Nov. 16, 2012, the entire contents of which are incorporated herein by reference.

TECHNICAL FIELD

The present application relates to a power conversion apparatus, and an energy conversion system, a transducer drive system, an active power filter and a solar grid inverter system using such a power conversion apparatus.

BACKGROUND

Switching operations of switching elements of a power conversion apparatus may cause a high voltage change rate (dv/dt) and a high current change rate (di/dt). A rapid change of a voltage and a rapid change of a current may cause common mode noise through a distributed capacitance between a system and the ground. The common mode noise flows into a grid, which will interfere with other electronic devices connected to the grid.

FIG. 1 illustratively shows a circuit diagram of a typical three-phase power converter topology and reasons for producing common mode noise. Reference number 11 indicates a power conversion unit which for example consists of three semiconductor bridge arms in parallel, and each bridge arm consists of two semiconductor devices. FIG. 1 shows, respectively, DC bus capacitors $C_{B1}$ 121 and $C_{B2}$ 122; DC bus midpoint O 123, i.e. a connection point of the DC bus capacitors $C_{B1}$ and $C_{B2}$; an alternative current (AC) source 15 such as a grid. Filter inductors La 131, Lb 132 and Lc 133 are shown respectively. A terminal of each filter inductor is connected to a corresponding phase line of the AC source 15, the other terminal of the inductor is connected with a corresponding midpoint of a bridge arm of the power conversion unit 11, and usually a distribution of the three filter inductors is symmetrical. Reference number 14 indicates a set of star-connected differential mode filter capacitor bank which includes for example three capacitor Cxs that are star-connected, and reference number 141 represents a common terminal N formed by connecting the three capacitor Cxs together. In FIG. 1, filter inductors La, Lb, Lc and X capacitor bank 14 constitute a differential mode filter. G represents the ground which for brevity is indicated only in one place, and other places are identified by the same device symbol. Reference number 16 represents Line Impedance Stabilization Network (LISN) which is an auxiliary equipment for testing conducted electromagnetic interference.

There exists a stray capacitance $C_0$ (100) between the DC bus midpoint O and the ground. Similarly, between midpoints A, B, and C of the bridge arms of the power conversion unit 11 and the ground there exist distributed stray $C_{1a}$ (101), $C_{1b}$ (102) and $C_{1c}$ (103) respectively. Potential jumping of the DC bus midpoint O as well as the midpoints of the bridge arms A, B and C relative to the ground may cause displacement current through the aforementioned stray capacitances $C_0$, $C_{1a}$, $C_{1b}$ and $C_{1c}$, and the displacement current flows into the ground and produces common mode noise.

In order to meet international EMC standards, how to suppress common mode noise effectively with low cost is a common concern in the field.

FIG. 2 illustratively shows a circuit diagram of a solution for suppressing common mode noise in conventional technique. FIG. 2 differs from FIG. 1 in that a passive common mode filter 17 is added on three-phase power supply lines between the grid 15 and the power conversion unit 11, to suppress common mode noise. Passive common mode filter 17 in FIG. 2 includes a common mode inductor $L_{CM}$(171) and a set of Y-capacitor bank 172 which includes, for example, three capacitor $C_y$s that are star-connected, and a common terminal $N_Y$ (173) of the three capacitor $C_y$s is connected to the ground.

However, the common mode inductor 171 in FIG. 2 is often of large size, and of high cost. Furthermore, when a large induction of a common mode inductor is required, it is even difficult to design the common mode inductors 171.

FIG. 3 illustrates another solution for suppressing common mode noise in conventional technique, that is, to reduce requirements on a common mode filter by reducing original common mode noise. FIG. 3 illustrates an exemplary circuit diagram of such a solution for suppressing common mode noise. FIG. 3 differs from FIG. 1 in that a common terminal N (141) of the star-connected X capacitor bank 14 is connected directly to the DC bus midpoint O (123). Since N is a virtual neutral point whose potential is relatively stable, after the DC bus midpoint O is directly connected to the virtual neutral point N, a potential of the bus relative to the ground is also clamped to a stable potential, which can reduce common mode noise to a certain extent.

However, the solution of FIG. 3 can only suppress common mode noise caused through a stray capacitance $C_0$ (100) between the DC bus of the power converter and the ground, while common mode currents caused by stray capacitances $C_{1a}$ (101), $C_{1b}$ (102), and $C_1$ (103) between the midpoint A, B and C of the bridge arms of the power conversion unit and the ground is far from being suppressed, but increases.

SUMMARY OF THE INVENTION

In order to solve at least one of the above-mentioned technical problems, in a first aspect, the present application provides a power conversion apparatus with low common mode noise, comprising a power conversion circuit. The power conversion circuit comprises: an AC source, a power conversion unit and a filter inductor unit. The power conversion unit includes DC terminals and AC terminals, the filter inductor unit includes first terminals and second terminals, the first terminals of the filter inductor unit are connected to the AC source, and the second terminals of the filter inductor unit are connected to the AC terminals of the power conversion unit. The power conversion apparatus further comprises a common mode noise suppression circuit. The common mode noise suppression circuit comprises: a capacitive impedance network and an impedance balancing network. The capacitive impedance network includes first terminals and second terminals; and the impedance balancing network includes first terminals and second terminals. The second terminals of the capacitive impedance network are connected to the first terminals of the impedance balancing network, the first terminals of the capacitive impedance network are connected to the first terminals of the filter inductor unit, and the second terminals of the impedance balancing network are connected to the DC terminals of the power conversion unit. The impedance balancing network and the filter inductor unit are configured to have the same impedance characteristics in a preset frequency band of electromagnetic interference.

In a second aspect, the present application also provides an energy conversion system, comprising: an AC source; a first power conversion unit with DC terminals and AC terminals; a second power conversion unit with DC terminals and AC terminals; a motor; and a common mode noise suppression circuit. Wherein the AC source is coupled to the AC terminals of the first power conversion unit, the DC terminals of the first power conversion unit are coupled to the DC terminals of the second power conversion unit, the AC terminals of the second power conversion unit are electrically coupled to the motor, and the common mode noise suppression circuit is coupled to the first power conversion unit. The first power conversion unit comprises: a first power conversion circuit and a filter inductor unit. The first power conversion circuit includes DC terminals and AC terminals. The filter inductor unit includes first terminals and second terminals, the first terminals of the filter inductor unit are connected to the AC source, and the second terminals of the filter inductor unit are connected to the AC terminals of the first power conversion unit. The common mode noise suppression circuit comprises: a capacitive impedance network and an impedance balancing network, the capacitive impedance network includes first terminals and second terminals; the impedance balancing network includes first terminals and second terminals; the second terminals of the capacitive impedance network are connected to the first terminals of the impedance balancing network, the first terminals of the capacitive impedance network are connected to the first terminals of the filter inductor unit, and the second terminals of the impedance balancing network are connected to the DC terminals of the first power conversion unit. Wherein the impedance balancing network and the filter inductor unit are configured to have the same impedance characteristics in a preset electromagnetic interference band.

In a third aspect, the present application also provides a power quality device, comprising: an inverter circuit unit and a common mode noise suppression circuit. The inverter circuit unit is connected to an AC source, the inverter circuit unit is adapted for compensating the reactive power and/or harmonics generated by a non-linear load that is electrically connected to the AC source, and the inverter circuit unit comprising: an inverter circuit and a filter inductor unit. The inverter circuit includes DC terminals and AC terminals, the filter inductor unit includes first terminals and second terminals, the first terminals of the filter inductor unit are connected to the AC source, and the second terminals of the filter inductor unit are connected to the AC terminals of the inverter circuit. The common mode noise suppression circuit comprises: a capacitive impedance network and an impedance balancing network. The capacitive impedance network includes first terminals and second terminals, the impedance balancing network includes first terminals and second terminals; wherein the second terminals of the capacitive impedance network are connected to the first terminals of the impedance balancing network, the first terminals of the capacitive impedance network are connected to the first terminals of the filter inductor unit, the second terminals of the impedance balancing network are connected to the DC terminals of the inverter circuit; and the impedance balancing network and the filter inductor unit are configured to have the same impedance characteristics in a preset electromagnetic interference band.

In a fourth aspect, the present application further provides an energy control system, comprising: a DC source; an AC source; an inverter circuit unit and a common mode noise suppression circuit. The inverter circuit unit comprises: an inverter circuit and a filter inductor unit. The inverter circuit includes DC terminals and AC terminals; the filter inductor unit includes first terminals and second terminals, the first terminals of the filter inductor unit are connected to the AC source, the second terminals of the filter inductor unit are connected to the AC terminals of the inverter circuit. The common mode noise suppression circuit comprises: a capacitive impedance network and an impedance balancing network. The capacitive impedance network includes first terminals and second terminals, and the impedance balancing network includes first terminals and second terminals. Wherein the second terminals of the capacitive impedance network are connected to the first terminals of the impedance balancing network, the first terminals of the capacitive impedance network are connected to the first terminals of the filter inductor unit, the second terminals of the impedance balancing network are connected to the DC terminals of the inverter circuit, the DC terminals of the inverter circuit are connected to the DC source; and the impedance balancing network and the filter inductor unit are configured to have the same impedance characteristics in a preset electromagnetic interference band.

According to the present application, the power conversion apparatus is capable of suppressing common mode noise of a power conversion apparatus effectively, or facilitates to reduce the size of the common mode filter inductor or difficulties in design of a common mode filter inductor, or reduce the overall cost of a power conversion apparatus.

BRIEF DESCRIPTION OF THE DRAWINGS

The embodiments of the present application will be described below with reference to the appended drawings, wherein.

DESCRIPTION OF THE PREFERRED EMBODIMENTS

The present application will be described with reference to FIGS. 5 to 13C. It shall be noted that, in the following illustrated drawings of the present application, elements having the same reference numbers in systems have the same function; if there exists crossing between line segments serving as connecting wires, the crossing labeled with a black spot "•" indicates that the crossing labeled is a connection point, the crossing labeled with no black spots "•" indicates that the crossing labeled is not a connection point but merely crossing over; turns of respective coils are only for illustration purposes, but not indicate the number of actual turns or turn ratio; reference signs of every inductor, transformer coil and capacitor not only indicate these elements themselves, but also indicate algebraic signs indicating the volume or value of these elements.

Figure 3:
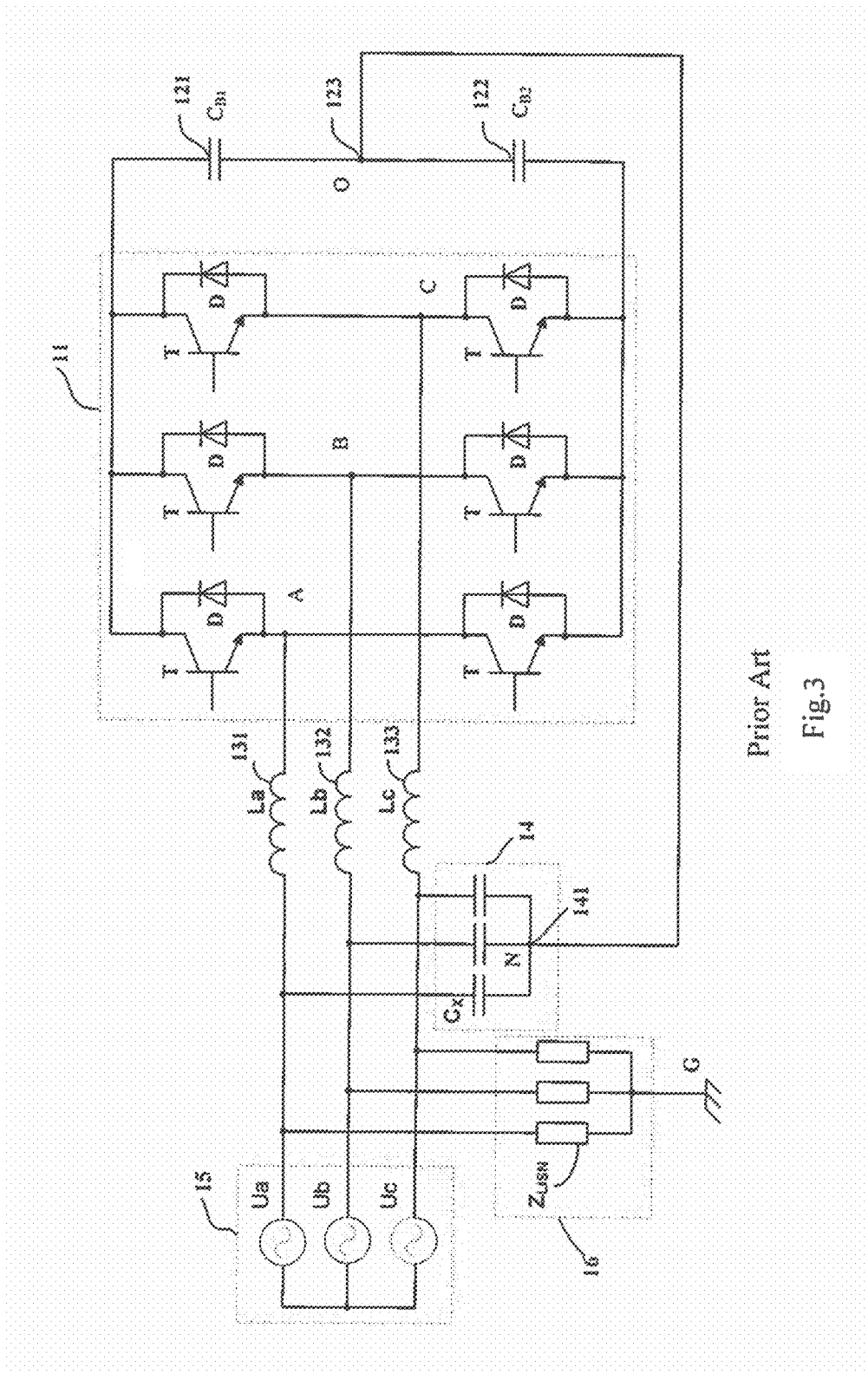
FIG. 3 illustratively shows a circuit diagram of another solution for suppressing common mode noise in conventional technique.
Figure 4:
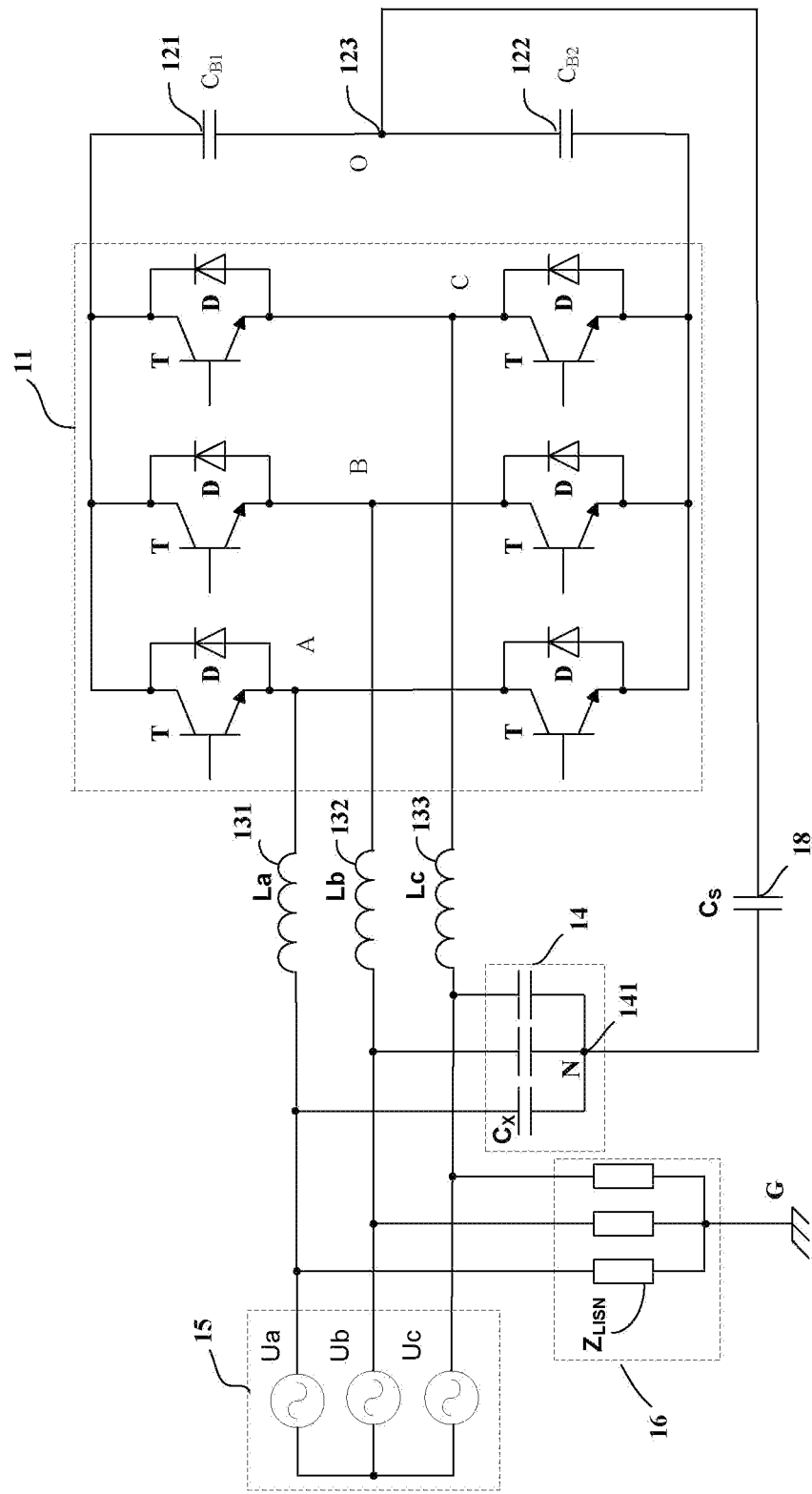
FIG. 4 illustratively shows a circuit diagram of a solution for suppressing common mode noise, which is capable of controlling a current of a zero sequence component.

In FIG. 3, a common terminal N (141) of the star-connected X capacitor bank 14 is directly connected to the DC bus midpoint O (123), so the current of the zero sequence component on the connection line may be relatively large. FIG. 4 illustratively shows a circuit diagram of a solution for suppressing common mode noise, which is capable of controlling a low frequency current of zero sequence component. FIG. 4 differs from FIG. 3 in that the common terminal N (141) of the X capacitor bank 14 is connected to the DC bus midpoint O (123) via a capacitor Cs (18), in order to appropriately control the current of the zero sequence component.

However, the solution of FIG. 4 can only suppress common mode noise caused through a distributed capacitance $C_0$ (100) between the DC bus and the ground, while the common mode current caused by distributed capacitances $C_{1a}$ (101), $C_{1b}$ (102) and $C_{1c}$ (103) between the midpoint A, B and C of bridge arms and the ground is far from being suppressed, but increases.

Figure 5:
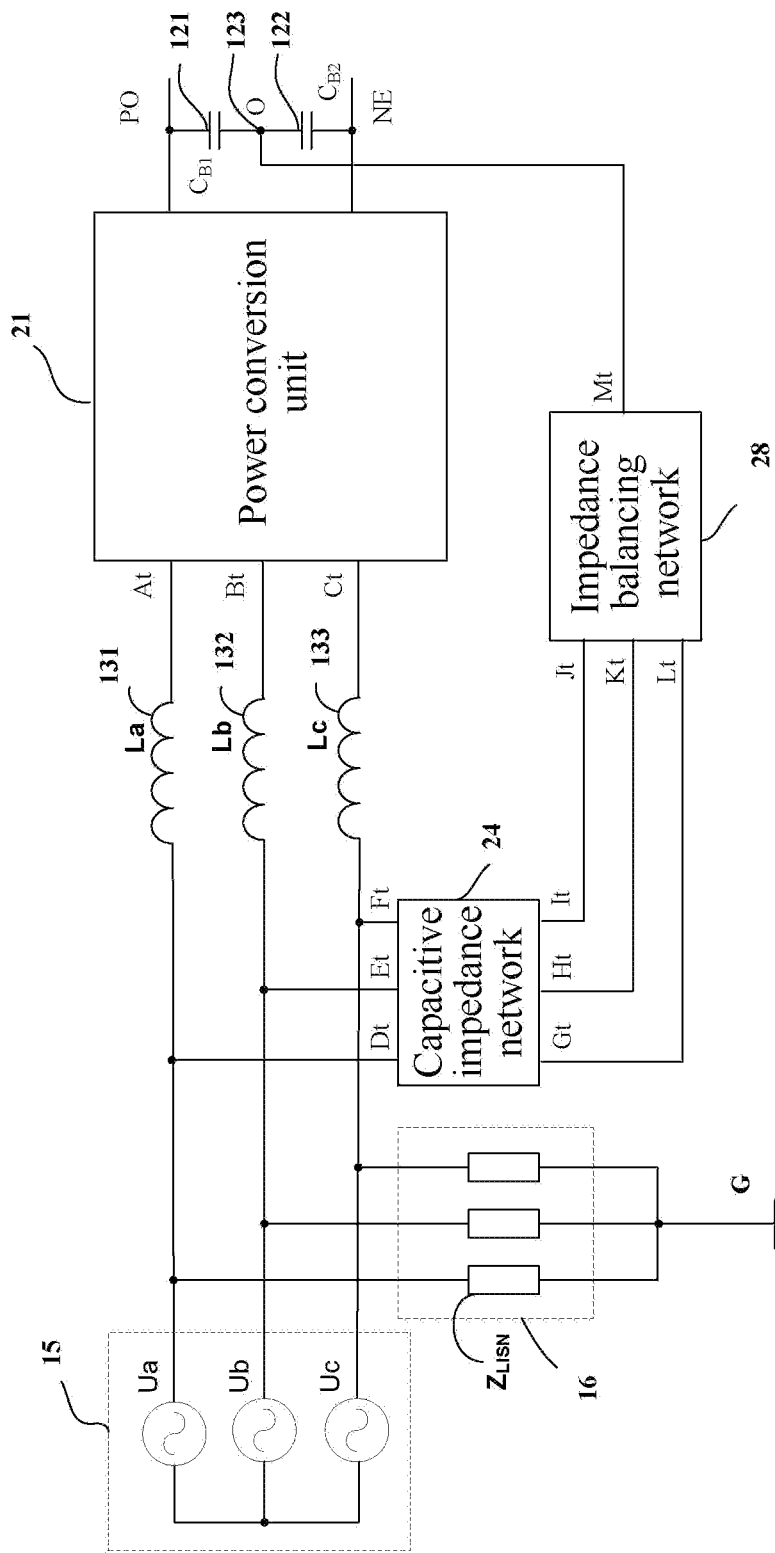
FIG. 5 illustratively shows a circuit diagram of a first embodiment of a power conversion apparatus with low common mode noise.

The present application provides a power conversion apparatus with low common mode noise. FIG. 5 illustratively shows a circuit diagram of a first embodiment of a power conversion apparatus with low common mode noise according to the present application. The power conversion apparatus with low common mode noise shown in FIG. 5 comprises: a power conversion unit 21 with DC terminals and AC terminals, wherein the DC terminals includes a positive terminal PO and a negative terminal NE, and the AC terminals includes three-phase AC terminals At, Bt and Ct. Voltages between the AC terminals of respective phases are low-frequency AC voltages having been modulated with high frequencies, and a distribution of the respective terminals are usually symmetrical. The power conversion unit 21 can be AC-DC rectifier or DC-AC inverter. DC bus capacitors $C_{B1}$ (121) and $C_{B2}$ (122) are connected in series between a positive terminal PO and a negative terminal NE of the DC terminals of the power conversion unit 21, and a connection point 123 of the DC bus capacitors $C_{B1}$ and $C_{B2}$ is the DC bus midpoint O, wherein there can be only one DC bus capacitor. An AC source 15 is a three-phase power including three phase voltages Ua, Ub and Uc. A filter inductor unit comprises filter inductor sub-units of the same number as that of the AC terminals of the power conversion unit 21. The filter inductor sub-unit may be a single inductor such as filter inductors La (131), Lb (132) and Lc (133). A set of terminals of the filter inductor unit are connected to the AC source 15, while another set of terminals of the filter inductor unit are connected to the AC terminals of the power conversion unit 21 correspondingly. The power conversion apparatus further includes a common mode noise suppression circuit. The common mode noise suppression circuit includes a capacitive impedance network 24 and an impedance balancing network 28. The capacitive impedance network 24 includes a first set of terminals Dt, Et and Ft, and a second set of terminals Gt, Ht and It. The first set of terminals Dt, Et and Ft are connected to respective phases of the AC source 15, that is, connected with a set of terminals of the filter inductor unit. The impedance balancing network 28 includes a third set of terminals Jt, Kt and Lt and a fourth terminal Mt, and the third set of terminals Jt, Kt and Lt are connected respectively to the corresponding second set of terminals Gt, Ht and It of the capacitive impedance network 24. The fourth terminal Mt is connected to the DC bus midpoint O (123) of the power conversion unit 21. In other embodiments, the fourth terminal Mt of the impedance balancing network 28 can also be connected with the positive electrode PO or negative electrode NE of the DC terminals of the power conversion unit 21. Wherein the impedance balancing network 28 has the same impedance characteristics, within a frequency range where common mode noise is to be suppressed, i.e. the preset electromagnetic interference band, as the filter inductors La (131), Lb (132) and Lc (133), for example, all of them are inductive impedance or capacitive impedance. The impedance characteristics involved herein all refer to either capacitive impedance or inductive impedance, and for example, the same impedance characteristics means they are both inductive impedance or both capacitive impedance in the concerning frequencies.

Figure 6A:
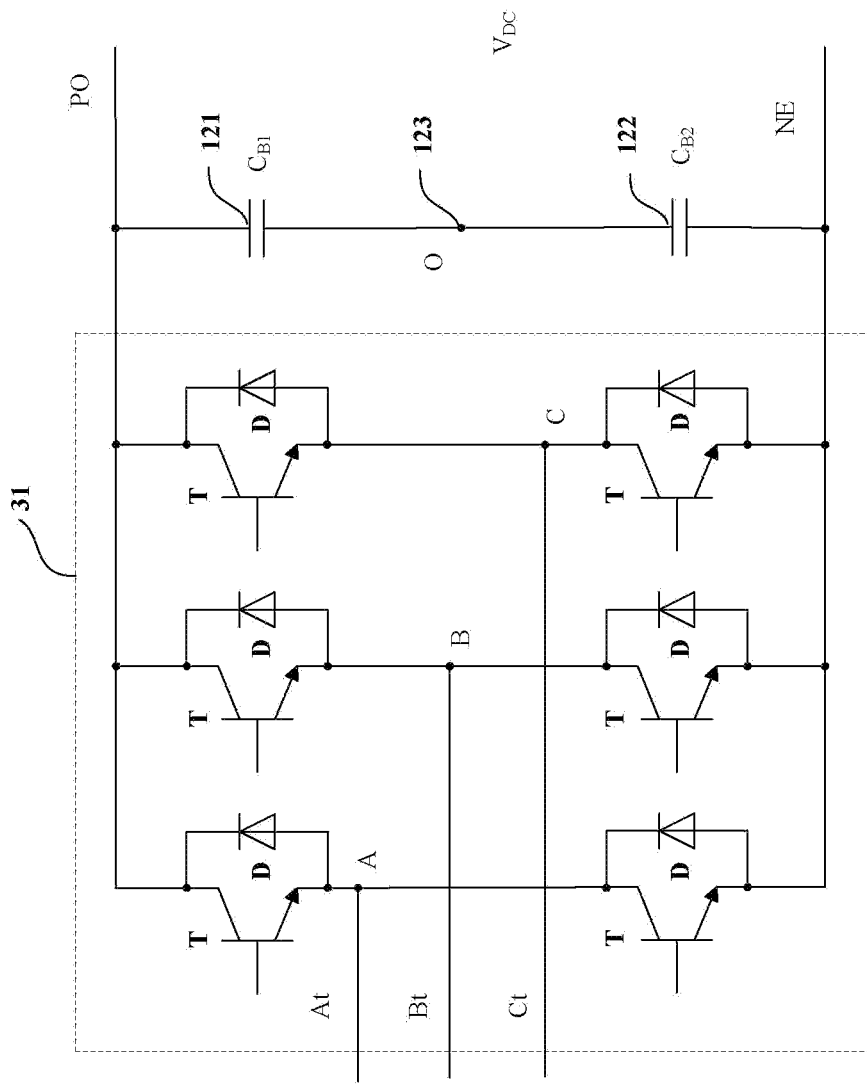
FIG. 6A illustratively shows a circuit diagram of an embodiment of a power conversion unit in a power conversion apparatus with low common mode noise.

The power conversion unit 21 in FIG. 5, for example, can be a power conversion unit 31 of a two-level circuit as shown in FIG. 6A. FIG. 6A illustratively shows a circuit diagram of an embodiment of a power conversion unit in a power conversion apparatus with low common mode noise according to the present application. Three-phase AC terminals At, Bt and Ct are connected respectively to corresponding midpoints A, B, and C of bridge arms of the power conversion unit 31 of a two-level circuit.

Figure 6B:
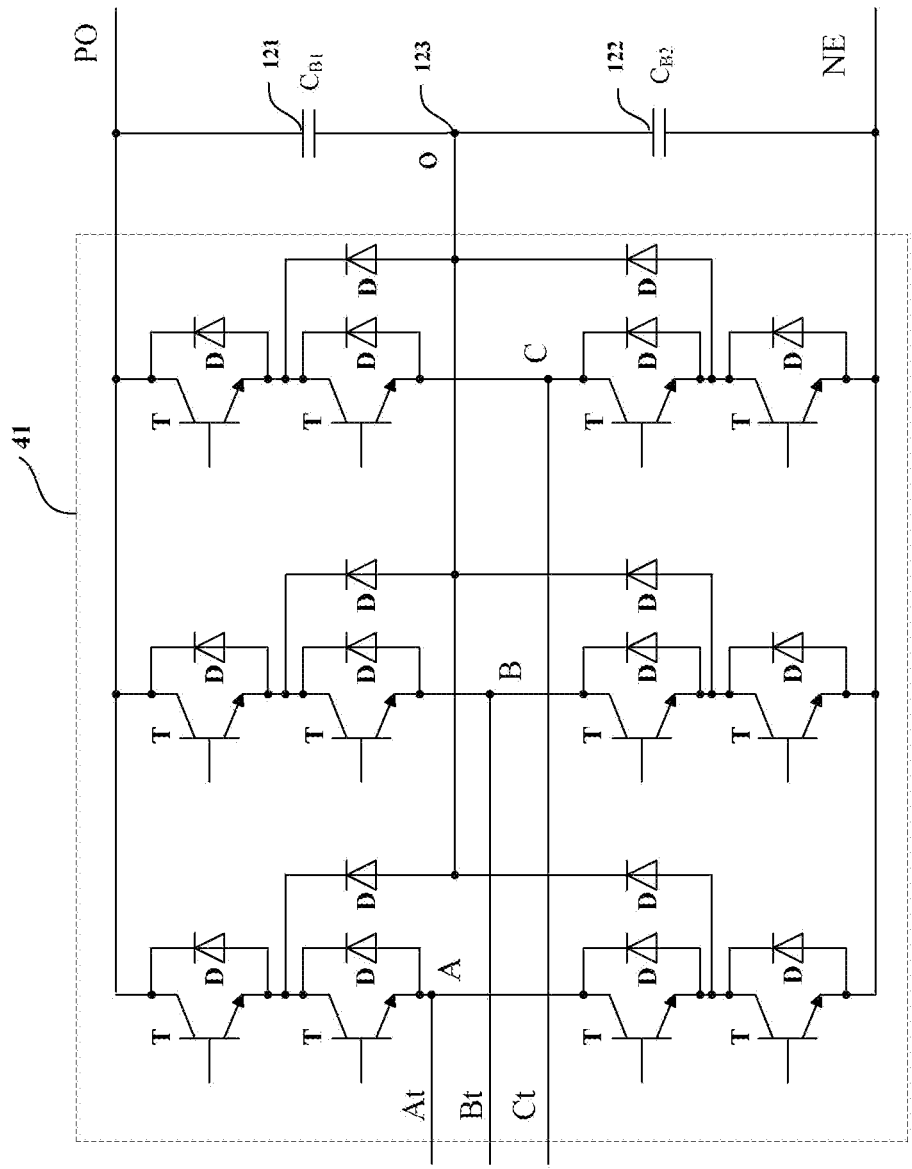
FIG. 6B illustratively shows a circuit diagram of another embodiment of a power conversion unit in a power conversion apparatus with low common mode noise.

The power conversion unit 21 in FIG. 5, for example, can be a power conversion unit 41 of a three-level circuit as shown in FIG. 6B. FIG. 6B illustratively shows a circuit diagram of another embodiment of a power conversion unit in a power conversion apparatus with low common mode noise according to the present application. Three-phase AC terminals At, Bt and Ct are connected respectively to corresponding midpoints A, B, and C of bridge arms of the power conversion unit 41 of a three-level circuit.

Figure 7A:
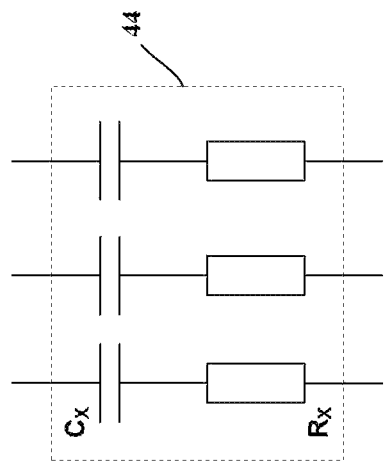
FIG. 7A illustratively shows a circuit diagram of an embodiment of a capacitive impedance network in a power conversion apparatus with low common mode noise.

The capacitive impedance network 24 in FIG. 5 can be, for example, a pure capacitive network 34 as shown in FIG. 7A. FIG. 7A illustratively shows a circuit diagram of an embodiment of a capacitive impedance network in a power conversion apparatus with low common mode noise according to the present application. The pure capacitive network 34 shown in FIG. 7A, for example, includes three capacitor Cxs, and can be used for three-phase applications, i.e. corresponding to the number of phases of the power conversion unit 21, and usually the three capacitor Cxs are configured to have the same parameters. Wherein each capacitor Cx can also be formed by combining and connecting a plurality of capacitors.

Figure 7B:
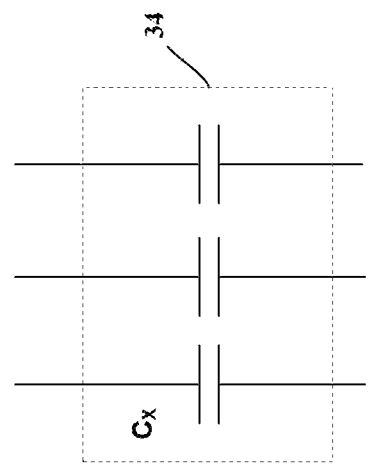
FIG. 7B illustratively shows a circuit diagram of another embodiment of a capacitive impedance network in a power conversion apparatus with low common mode noise according to the present application.

The capacitive impedance network 24 in FIG. 5 can be, for example, an RC network 44 as shown in FIG. 7B. FIG. 7B illustratively shows a circuit diagram of another embodiment of a capacitive impedance network in a power conversion apparatus with low common mode noise according to the present application. The RC network 44 shown in FIG. 7B includes three capacitive branches, corresponding to the number of AC terminals of the power conversion unit 21, and usually the three capacitive branches are configured to have the same parameters. Wherein each capacitive branch includes a capacitor Cx and a resistance Rx in series, and as the RC network 44 is a passive network for coupling AC, it does not involve polarity, that is, it can also be used after being turned upside down, or after swapping a position of the capacitor and the resistance. In embodiments of other capacitive impedance networks, each capacitive branch can be formed by combining and connecting a plurality of capacitors and resistors.

Figure 8C:
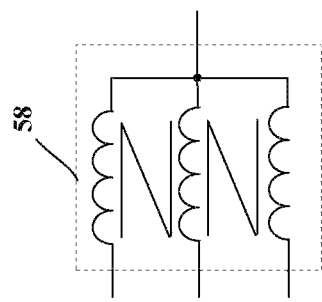
FIG. 8C illustratively shows a circuit diagram of a further another embodiment of an impedance balancing network in a power conversion apparatus with low common mode noise.
Figure 8B:
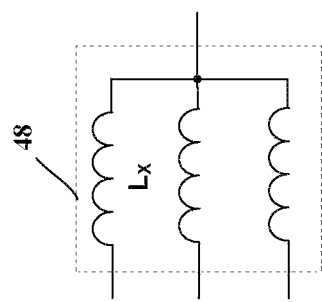
FIG. 8B illustratively shows a circuit diagram of another embodiment of an impedance balancing network in a power conversion apparatus with low common mode noise.
Figure 8A:
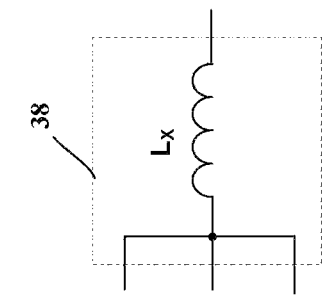
FIG. 8A illustratively shows a circuit diagram of an embodiment of an impedance balancing network in a power conversion apparatus with low common mode noise.

The impedance balancing network 28 in FIG. 5 can be, for example, a single inductor Lx (38) as shown in FIG. 8A. FIG. 8A illustratively shows a circuit diagram of an embodiment of an impedance balancing network in a power conversion apparatus with low common mode noise according to the present application. A terminal of the single inductor Lx shown in FIG. 8A is connected to the second set of terminals Gt, Ht and It of the capacitive impedance network 24 respectively, the other terminal of the single inductor Lx can be connected directly or via a capacitor and/or a resistor to the DC terminal of the power conversion unit 21, such as the DC bus midpoint O (123).

The impedance balancing network 28 in FIG. 5 can be, for example, a non-coupled inductor network 48 as shown in FIG. 8B. FIG. 8B illustratively shows a circuit diagram of another embodiment of an impedance balancing network in a power conversion apparatus with low common mode noise according to the present application. The non-coupled inductor network 48 shown in FIG. 8A includes, for example, three inductor Lxs, one terminal of each inductor Lx is connected with a corresponding one of the second set of terminals Gt, Ht and It of the capacitive impedance network 24, and usually the three inductor Lxs are configured to have the same parameters, and the other terminal of each inductor Lx can be connected directly or via a capacitor and/or a resistor to the DC terminal of the power conversion unit 21, such as the DC bus midpoint O (123).

The impedance balancing network 28 in FIG. 5 can be, for example, a coupled inductor network 58 as shown in FIG. 8C. FIG. 8C illustratively shows a circuit diagram of a further another embodiment of an impedance balancing network in a power conversion apparatus with low common mode noise according to the present application. The coupled inductor network 58 shown in FIG. 8C is, for example, a three-phase coupled inductor including three windings, each terminal of a first set of terminals of the three-phase coupling windings is connected respectively with a corresponding one of the second set of terminals Gt, Ht and It of the capacitive impedance network 24, the other set of terminals of the three windings, i.e. a common terminal of the three-phase coupled inductors can be connected directly or via a capacitor to the DC terminal of the power conversion unit 21, such as the DC bus midpoint O (123). Wherein the three windings are magnetically coupled to each other. There exist a variety of ways to implement a magnetically-coupling, so no further example will be given herein.

Figure 9A:
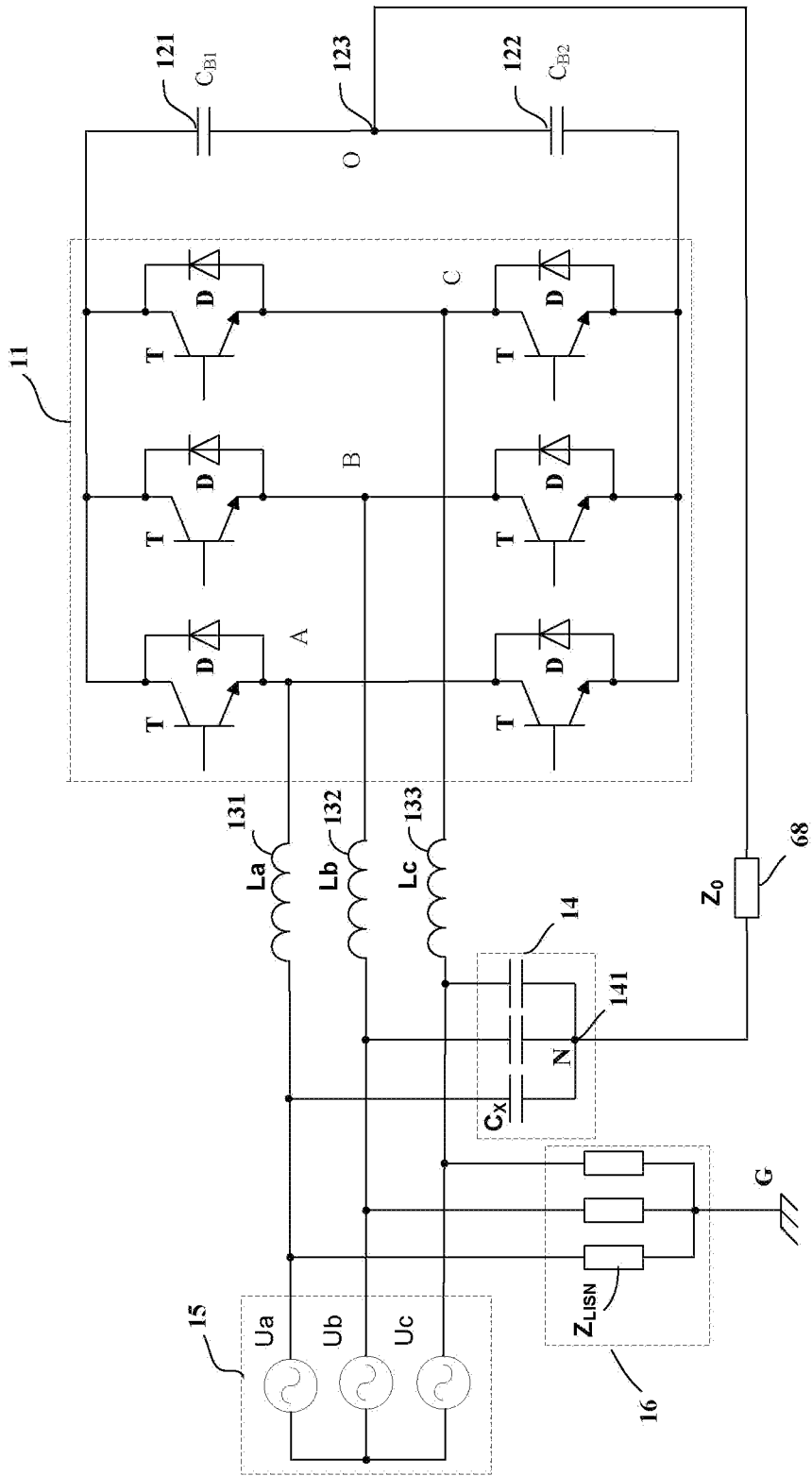
FIG. 9A illustratively shows a circuit diagram of a second embodiment of a power conversion apparatus with low common mode noise.

FIG. 9A illustratively shows a circuit diagram of an embodiment of a power conversion apparatus with low common mode noise according to the present application. Wherein an impedance of an impedance balancing network is indicated as a balancing impedance $Z_0$ (68). The balancing impedance $Z_0$ and filter inductors La (131), Lb (132) and Lc (133) that constitute a filter inductor unit are configured to have the same impedance characteristics, for example, present inductive characteristic within a frequency range where common mode noise is to be suppressed.

For a better understanding of the present application, the principle of the present application will be further explained by way of equivalent circuits of equivalent model circuits.

Figure 9B:
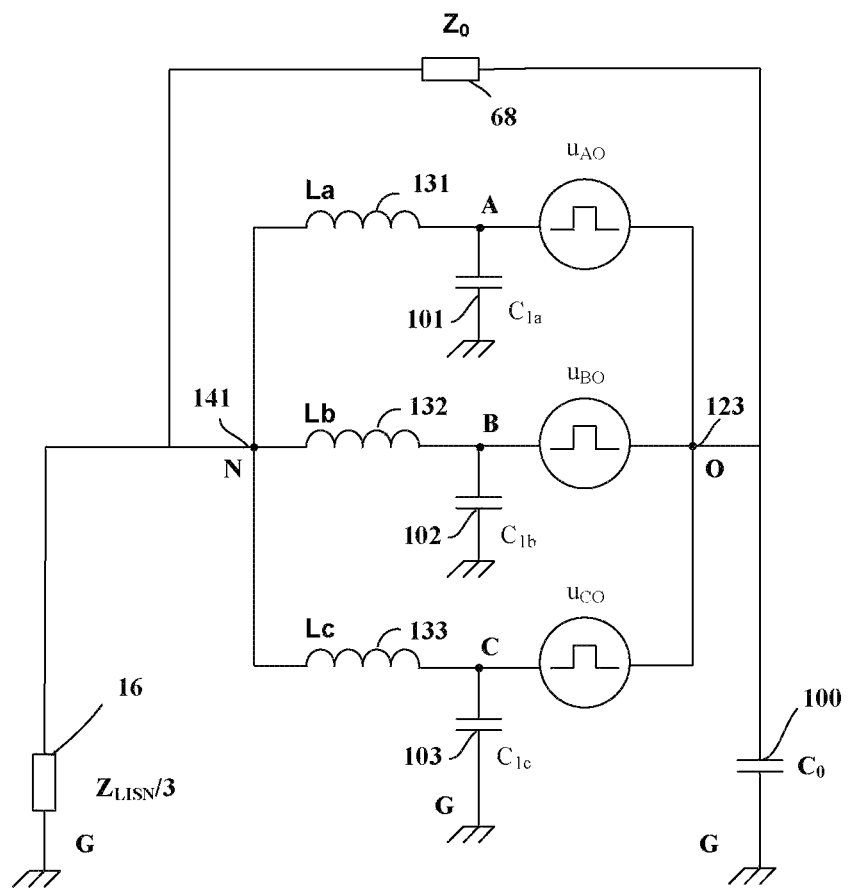
FIG. 9B illustratively shows a model circuit diagram established with respect to the common mode noise produced by the three phases of the power conversion apparatus of FIG. 9A.

FIG. 9B illustratively shows a model circuit diagram established with respect to the common mode noise produced by the three phases of the power conversion apparatus of FIG. 9A. A common mode noise model circuit is built based on FIG. 9A. As shown in FIG. 9B, the common mode noise equivalent model includes the distributed capacitance $C_O$ (100) between the DC bus midpoint O and the ground; the distributed capacitances $C_{1a}$ (101), $C_{1b}$ (102) and $C_{1c}$ (103) respectively between the midpoints A, B and C of the bridge arms of the power conversion unit 11 and the ground; the filter inductors La (131), Lb (132) and Lc (133); voltages $u_{AO}$, $u_{BO}$ and $u_{CO}$; and the Line Impedance Stabilization Network 16. In the equivalent model circuit, the voltages $u_{AO}$, $u_{BO}$, and $u_{CO}$ are the voltages respectively between the midpoints A, B and C of the bridge arms and the DC bus midpoint O. The Line Impedance Stabilization Network is an auxiliary equipment for testing interference, the impedance of the Line Impedance Stabilization Network 16 is equivalent to $Z_{LISN}/3$, and the voltage drop thereon is a common mode voltage.

According to the principle of linear superposition, analysis can be performed separately on the three phase voltages $u_{AO}$, $u_{BO}$ and $u_{CO}$ of FIG. 9B respectively. For example, in the analysis of common mode noise caused by the voltage $u_{AO}$, the voltages for the other two phases $u_{BO}$ and $u_{CO}$ can be regarded as short circuits, and in this way, an equivalent circuit shown in FIG. 9C can be further obtained.

Figure 9D:
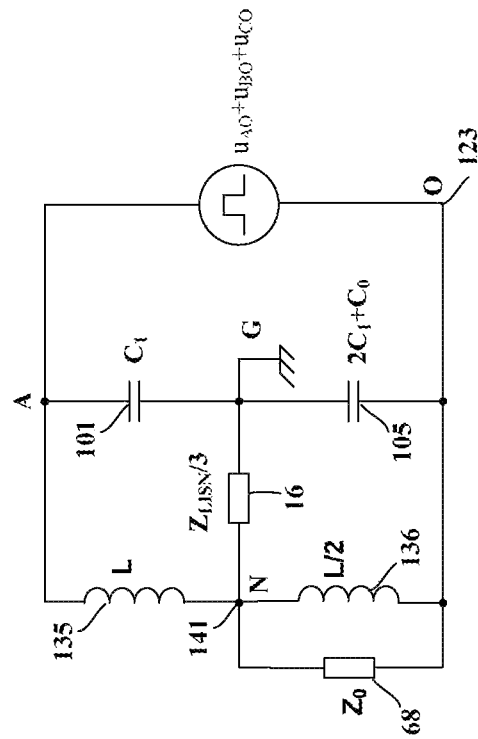
FIG. 9D illustratively shows a model equivalent circuit diagram with respect to the common mode noise of FIG. 9B in case that the three phases are completely symmetrical.
Figure 9C:
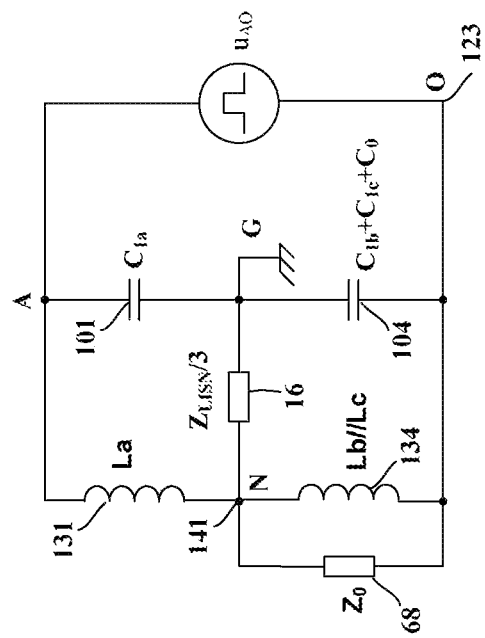
FIG. 9C illustratively shows a model equivalent circuit diagram with respect to the common mode noise generated by one phase of FIG. 9B.

FIG. 9C illustratively shows an equivalent model circuit diagram with respect to the common mode noise generated by one phase of FIG. 9B. As shown in FIG. 9C, the equivalent model circuit comprises an inductive branch. The inductive branch comprises filter inductors Lb and Lc in parallel, i.e. Lb//Lc (134), the balancing impedance $Z_0$ (68) and the filter inductor La (131). The Lb//Lc (134) is in parallel with the balancing impedance $Z_0$ (68) and in series with the filter inductor La (131). The filter inductor La (131), the paralleled filter inductors Lb//Lc (134) and the balancing impedance $Z_0$ are connected at a connection point which is referred to as a first node. The equivalent model circuit further includes a capacitive branch. The capacitive branch comprises the distributed capacitances $C_{1a}$ (101), and $C_{1b}$, $C_1$ and $C_0$ (104). The distributed capacitances $C_{1b}$, $C_{1c}$ and $C_0$ (104) are in parallel with each other and in series with the distributed capacitance $C_{1a}$, and the distributed capacitance $C_{1a}$ and the other distributed capacitances are connected at a connection point which is referred to as a second node. Two terminals of the Line Impedance Stabilization Network 16 are connected respectively with the first node and the second node. The circuit shown in FIG. 9C constitutes a Wheatstone bridge.

If an equilibrium condition for the bridge is met, the voltage across the Line Impedance Stabilization Network 16 is zero, i.e. the common mode voltage is zero. That is, only the following formula needs to be satisfied:

$$\frac{Z_{La}}{Z_0 // Z_{Lb} // Z_{Lc}} = \frac{Z_{C_{1a}}}{Z_{C_{1b}} // Z_{C_{1c}} // Z_{C_0}}, \quad (1)$$

wherein $Z_{La}$ is the impedance of the filter inductor La, $Z_0$ is the impedance of the balancing impedance $Z_0$, $Z_{Lb}$ is the impedance of the filter inductor Lb, $Z_{Lc}$ is the impedance of the filter inductor Lc, $Z_{C_{1a}}$ is the impedance of the distributed capacitance $C_{1a}$, $Z_{C_{1b}}$ is the impedance of the distributed capacitance $C_{1b}$, and $Z_{C_0}$ is the impedance of the distributed capacitance $C_0$. Then, when the voltage across the Line Impedance Stabilization Network 16 is small or nearly equals to 0, the common mode noise generated by the phase on which the La is located can be suppressed to a certain degree.

Since an actual inductor is non-ideal inductor, distribution parameters exist in it, and at high frequencies its impedance may present a capacitive characteristic. For example, the aforementioned filter inductors La, Lb and Lc may be inductive when frequencies are lower than 10 MHz, and may be capacitive when frequencies are higher than 10 MHz. In order to satisfy the formula (1), if the Wheatstone bridge needs to reach equilibrium in a wide frequency range, the balancing impedance $Z_0$ shall be configured to have the same impedance characteristic as the filter inductors La, Lb and Lc, and might present an inductive characteristic or a capacitive characteristic in a preset electromagnetic interference frequency range, e.g. within a frequency range of common mode noise. For example, at low frequencies, the impedances of the filter inductors La, Lb and Lc are inductive impedance respectively, then the balancing impedance $Z_0$ also needs to be rendered inductive characteristic; and at high frequencies, the filter inductors show capacitive impedances respectively, then the balancing impedance $Z_0$ needs to be rendered capacitive characteristic correspondingly.

By analogy, equivalent model circuits with respect to common mode noise of the other two phases are substantially the same as that shown in FIG. 9C. In order to achieve a balance between common mode noise on respective phases, the value of the balancing impedance $Z_0$ may be different. Therefore, it is possible to design $Z_0$ based on a phase that is a major source of common mode noise, and to select parameters of the balancing impedance $Z_0$ such that common mode noise on the said phase is suppressed. Otherwise, the parameters of the balancing impedance $Z_0$ may also be designed as deeded such that the total common mode noise of the three phases is kept minimized.

In view of the purpose that the common mode noise on every phases is to be suppressed to some extent, the structure of the power conversion unit is configured symmetrically, i.e., each phase comprises the same number and the same type of components, and the same element has the same parameters and connection relationship. Thus, it can be assumed that respective filter inductors satisfy La=Lb=Lc=L, and the distributed capacitances between the power conversion unit 11 and the ground satisfy $C_{1a}=C_{1b}=C_{1c}=C_1$.

The equivalent model circuit shown in FIG. 9D differs from that of FIG. 9C mainly in that, FIG. 9D is obtained by introducing the aforementioned assumed parameters of the filter inductors and the distributed capacitances into FIG. 9C. Since the structure of the power conversion unit is symmetrical, and the parameters of the same elements are the same, according to the principle of linear superposition, the voltage $u_{AO}$ of FIG. 9C can be replaced by the sum of voltages $u_{AO}$, $u_{BO}$ and $u_{CO}$. Accordingly, the common mode noise model of the power conversion apparatus shown in FIG. 9B can be equivalent into the equivalent model circuit shown in FIG. 9D.

As shown in FIG. 9D, to make the Wheatstone bridge shown in FIG. 9D reach equilibrium, the voltages of the two terminals of the Line Impedance Stabilization Network are equal, namely the following formula is satisfied:

$$\frac{Z_L}{Z_0 // Z_L/2} = \frac{Z_{C_1}}{Z_{C_1}/2 // Z_{C_0}}, \quad (2)$$

Wherein, $Z_L$, $Z_{C_1}$ and $Z_{C_0}$ are the impedances of the filter inductor L, the distributed capacitance $C_1$ and $C_0$, and $Z_0$ is the impedance of the balancing impedance $Z_0$.

In practical engineering applications, there may exist a certain tolerance (for example, 10%) in the three filter inductors La, Lb and Lc, or there may exist a certain tolerance (for example, 10%) in the three distributed capacitances $C_{1a}$, $C_{1b}$ and $C_1$ as well. Then, a common mode noise suppression effect based on the value of the balancing impedance $Z_0$ obtained according to the formula (2) will have some deviation from the expected effect, which is within a normal allowable range.

Figure 10:
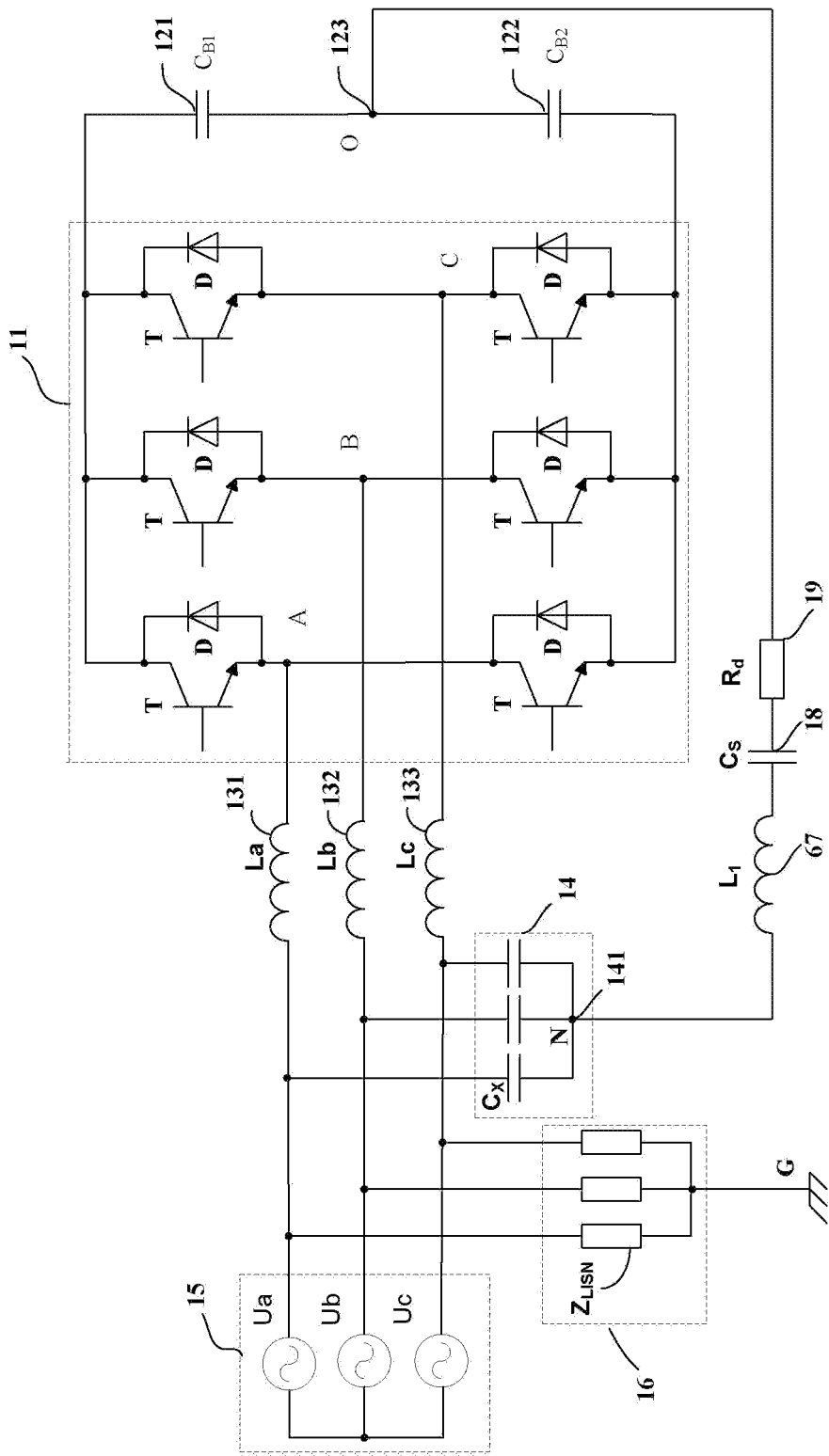
FIG. 10 illustratively shows a circuit diagram of a third embodiment of a power conversion apparatus with low common mode noise.

FIG. 10 illustratively shows a circuit diagram of a further embodiment of a power conversion apparatus with low common mode noise according to the present application. The circuit shown in FIG. 10 is another specific embodiment of the technical solution shown in FIG. 5. FIG. 10 differs from FIG. 9A in that FIG. 10 illustrates more particularly the impedance balancing network comprising an inductor $L_1$ (67), a DC-blocking capacitor $C_s$ (18) and a damping resistor $R_d$ (19), and these three parts being connected in series with each other.

As for the impedance balancing network shown in FIG. 10, when frequency is lower than the resonance frequency $f_0$ of the inductor $L_1$ and the DC-blocking capacitor $C_s$, i.e., below the resonant frequency $f_0$, the impedance of the series branch of the inductor $L_1$, the DC-blocking capacitor $C_s$ and the damping resistor $R_d$ mainly depends on the DC-blocking capacitor $C_s$, thereby zero sequence current of low frequencies is limited or blocked. When frequency is higher than the resonance frequency $f_0$ of the inductor $L_1$ and the DC-blocking capacitor Cs, i.e., above the resonant frequency $f_0$, the impedance of the series branch of the inductor $L_1$, the DC-blocking capacitor $C_s$ and the damping resistor $R_d$ mainly depends on the inductor $L_1$. Therefore, in practice, in order to ensure that the impedance balancing network and filter inductors are configured to have the same impedance characteristics, in preset electromagnetic interference band such as in an interference band where common mode noise exists, so as to achieve a common mode noise suppression effect, the resonant frequency of the impedance balancing network can be set less than the minimum frequency of the interference band. For instance, when the electromagnetic interference band of concern locates at 9 kHz-30 MHz, $f_0$ can be simply set less than 9 kHz, for example, $f_0$=1 kHz can be assumed.

Upon the inductor $L_1$ and the blocking capacitor $C_s$ becoming resonating, the damping resistor $R_d$ in FIG. 10 plays a role of damping, so as to avoid an excessively large current being produced in the series branch of the inductor $L_1$, the DC-blocking capacitor $C_s$ and the damping resistor $R_d$.

Although the above various embodiments mainly discuss situations where the power conversion unit in a power conversion apparatus is a three-phase power conversion unit, the power conversion unit in a power conversion apparatus is not limited to the three-phase power conversion unit, and it may be a single-phase power conversion unit.

Figure 11:
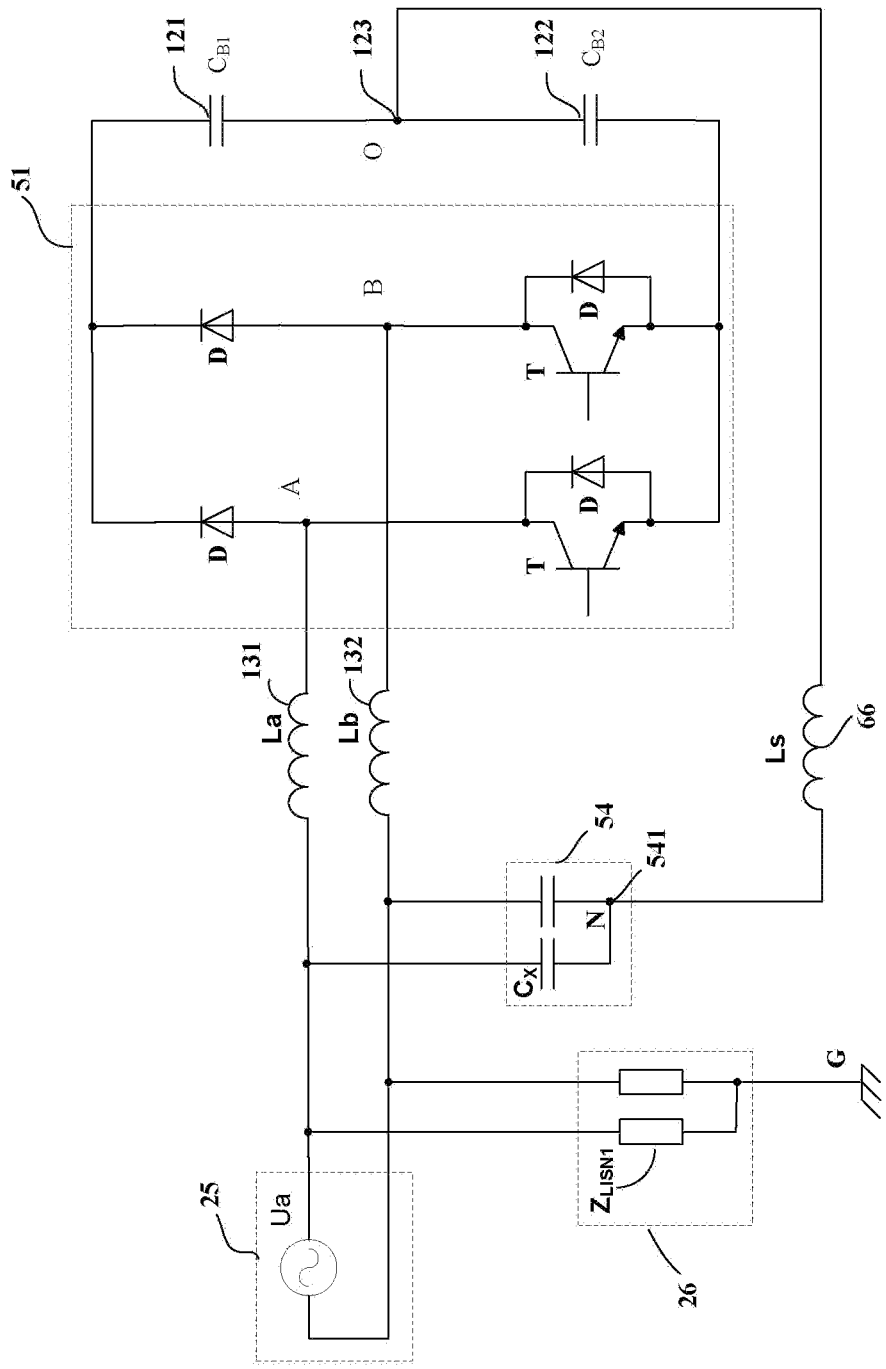
FIG. 11 illustratively shows a circuit diagram of a fourth embodiment of a power conversion apparatus with low common mode noise.

For example, FIG. 11 illustratively shows a circuit diagram of an embodiment of a power conversion unit in a power conversion apparatus with low common mode noise, which is a single-phase power conversion unit What the FIG. 11 shows includes a single-phase AC source 25, a single-phase power conversion unit 51, a capacitive impedance network 54, a filter inductor unit consisting of filter inductors La (131) and Lb (132), and an impedance balancing network comprising an inductor Ls (66). The single-phase power conversion unit shown in FIG. 11 includes two AC terminals. The capacitive impedance network 54 comprises two capacitors, one terminal of each capacitor is connected correspondingly with one terminal of the single-phase power conversion unit, and the other terminal of the capacitor is connected to the impedance balancing network. In the embodiment shown in FIG. 11, the impedance balancing network is a single inductor Ls (66). The single-phase power conversion unit 51 has two bridge arms, and the two bridge arms include bridge arm midpoints A and B. Take the bridge arm midpoint A as an example, according to the aforementioned equivalent model of common mode noise, for suppressing common mode noise that may be generated at the bridge arm midpoint A, the following formula needs to be satisfied:

$$\frac{Z_{La}}{Z_{Ls} // Z_{Lb}} = \frac{Z_{C_{1a}}}{Z_{C_{1b}} // Z_{C_0}}, \quad (1)$$

wherein $C_{1a}$ and $C_{1b}$ represent distributed capacitances between the bridge arm midpoint A and the ground, and between the bridge arm midpoint B and the ground, respectively. $C_0$ represents a distributed capacitance between the DC bus midpoint 123 and the ground. Z represents the symbol of impedance, for example $Z_{La}$ represents the impedance of the filter inductor La, the others can be dealt with by analogy.

As described in the above embodiment, provided that two bridge arms of the single-phase power conversion unit 51 are of symmetrical structure, i.e., each bridge arm comprises the same number and the same type of components, and the connection relationship with respect to the same element is the same, and the same element of each arm has the same parameters, such that the impedance balancing network with one impedance value may provide an effect of suppressing simultaneously common mode noise caused by the two bridge arm midpoints. However, in the actual situation, if the structure of the two bridge arms is not symmetric, the impedance of the impedance balancing network can be designed according to the actual demand or for the purpose of eliminating the main source of common mode noise.

The aforementioned power conversion apparatuses shall not be limited to the embodiments described above. In fact, it is also feasible to mutually combine the modifiable embodiments of various components of the power conversion apparatus described above. Accordingly, the power conversion apparatus claimed by the present application are not limited to the above exemplified embodiments, but shall be based on the scope of the claimed subject matter of the appended claims.

Figure 12A:
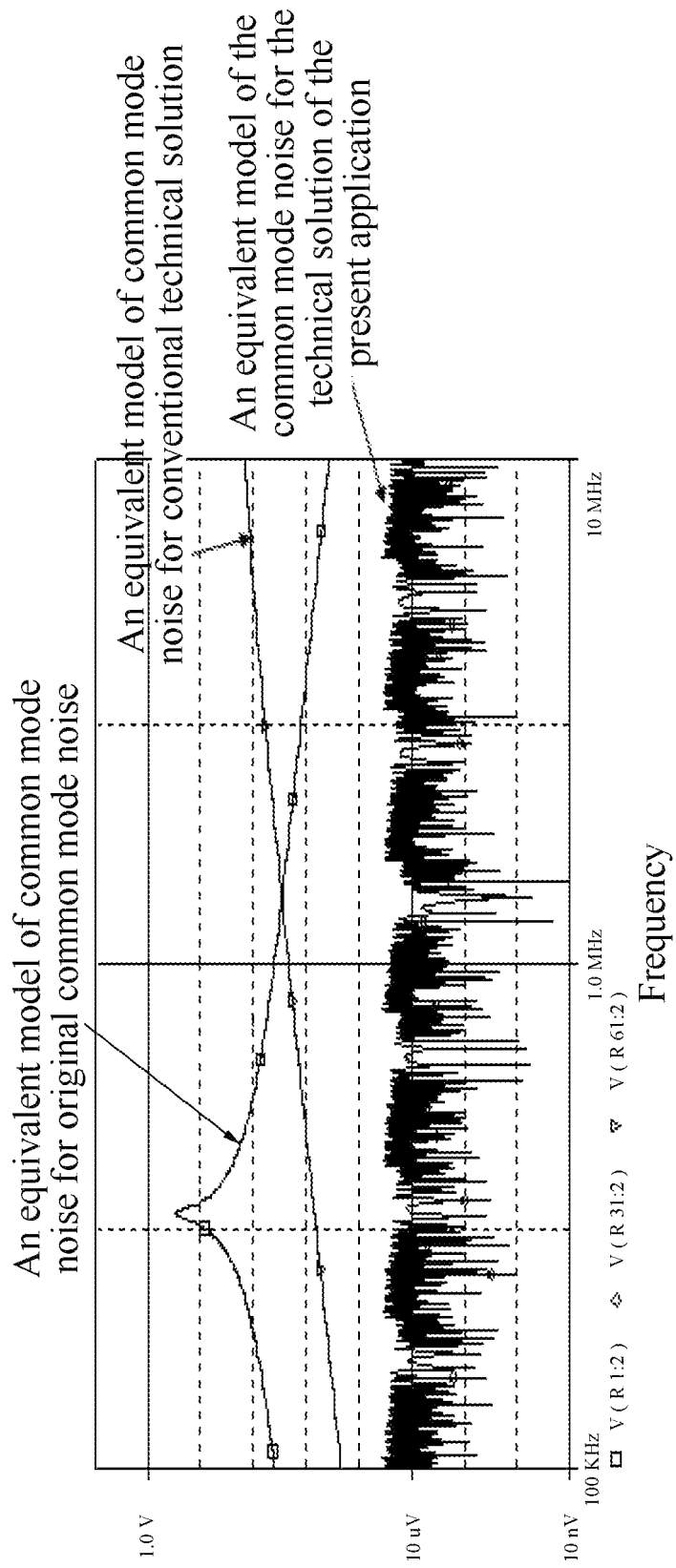
FIG. 12A illustratively shows AC scan results of original common mode noise, a conventional technical solution, and a technical solution of the present application, based on respective common mode noise equivalent models.

FIG. 12A illustratively shows AC scan simulation results of the original common mode noise, the conventional technical solution, and the technical solution of the present application, wherein simulation models are corresponding equivalent circuit models of common mode noise respectively. The equivalent model of common mode noise for the original common mode noise is based on the circuit shown in FIG. 1. The equivalent model of common mode noise for the conventional technical solution is based on the circuit shown in FIG. 3. In FIG. 12A, the equivalent model of common mode noise for the technical solution of the present application is based on FIG. 9D as an example. Assuming that the parameters of the related elements in the equivalent models of common mode noise are the same for the these three solutions, for example, the distributed capacitance $C_1$ between each midpoint of the bridge arms and the ground is 20 picofarads, the distributed capacitance $C_0$ between the midpoint of the DC bus and the ground is 1 nanofarad, the filter inductor L for each phase is 700 microhenries, the impedance $Z_{LISN}$ of the Line Impedance Stabilization Network 16 is 50 ohms, and the balancing impedance $Z_0$ shown in FIG. 9D is configured as an inductor of 14 microhenries. Three simulation results are shown in FIG. 12A, the result for the original common mode noise is shown as a curve indicated by small rectangles, the result for common mode noise in the conventional technical solution is shown as a curve indicated by small triangles, and the remaining curve denotes simulation result for the equivalent model shown in FIG. 9D in combination with the above specific parameter values. It can be seen from the results shown in FIG. 12 that: when frequencies lower than about 1.3 MHz, the conventional technical solution shown in FIG. 3 provides suppression to common mode noise to a certain extent, and as the frequency goes higher than 1.3 MHz, common mode noise increases on the contrary actually; while in the exemplified technical solution of the present application, common mode noise has been reduced to a level of background noise.

Figure 1:
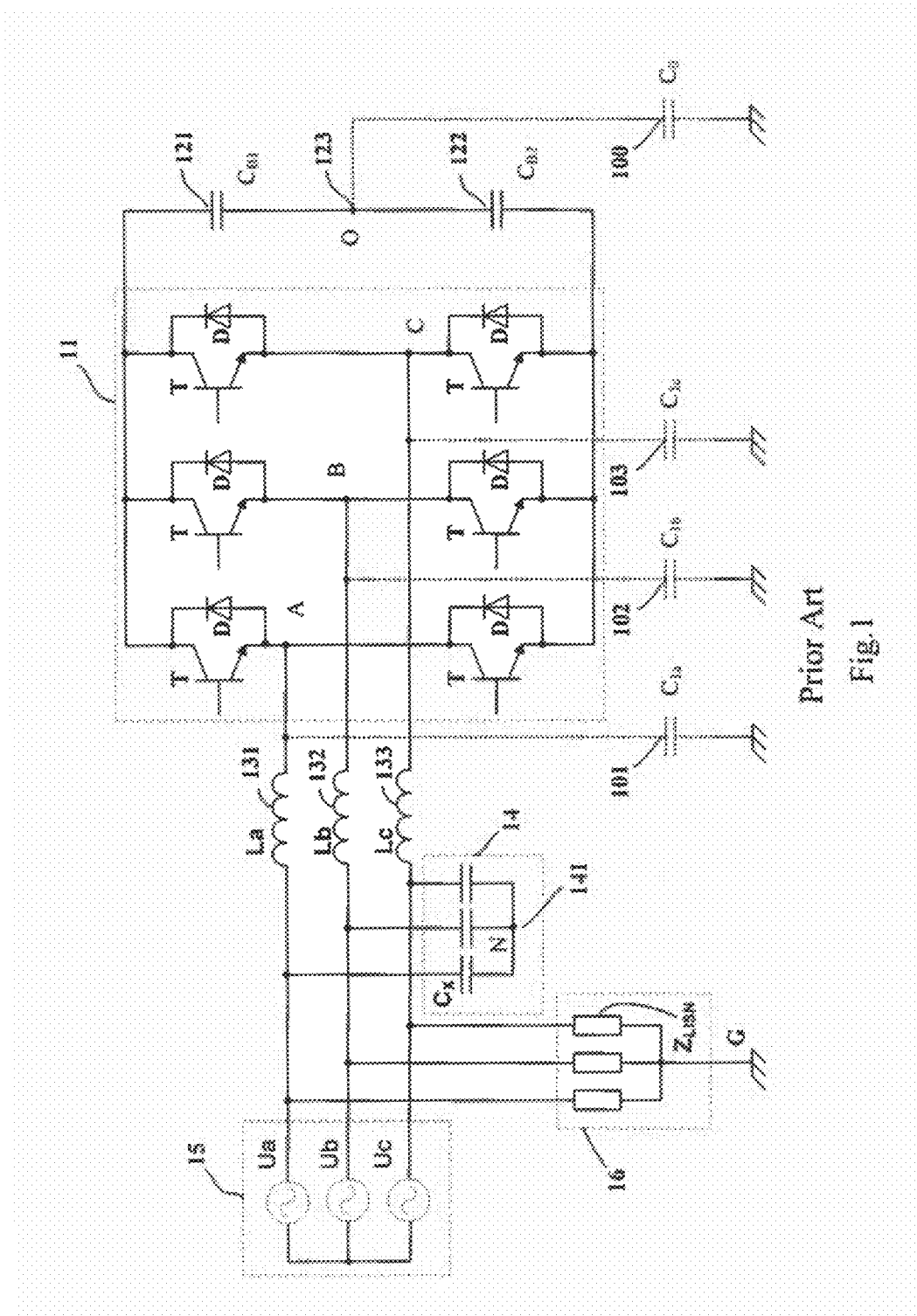
FIG. 1 illustratively shows a circuit diagram of a typical three-phase power converter topology and reasons for producing common mode noise.
Figure 2:
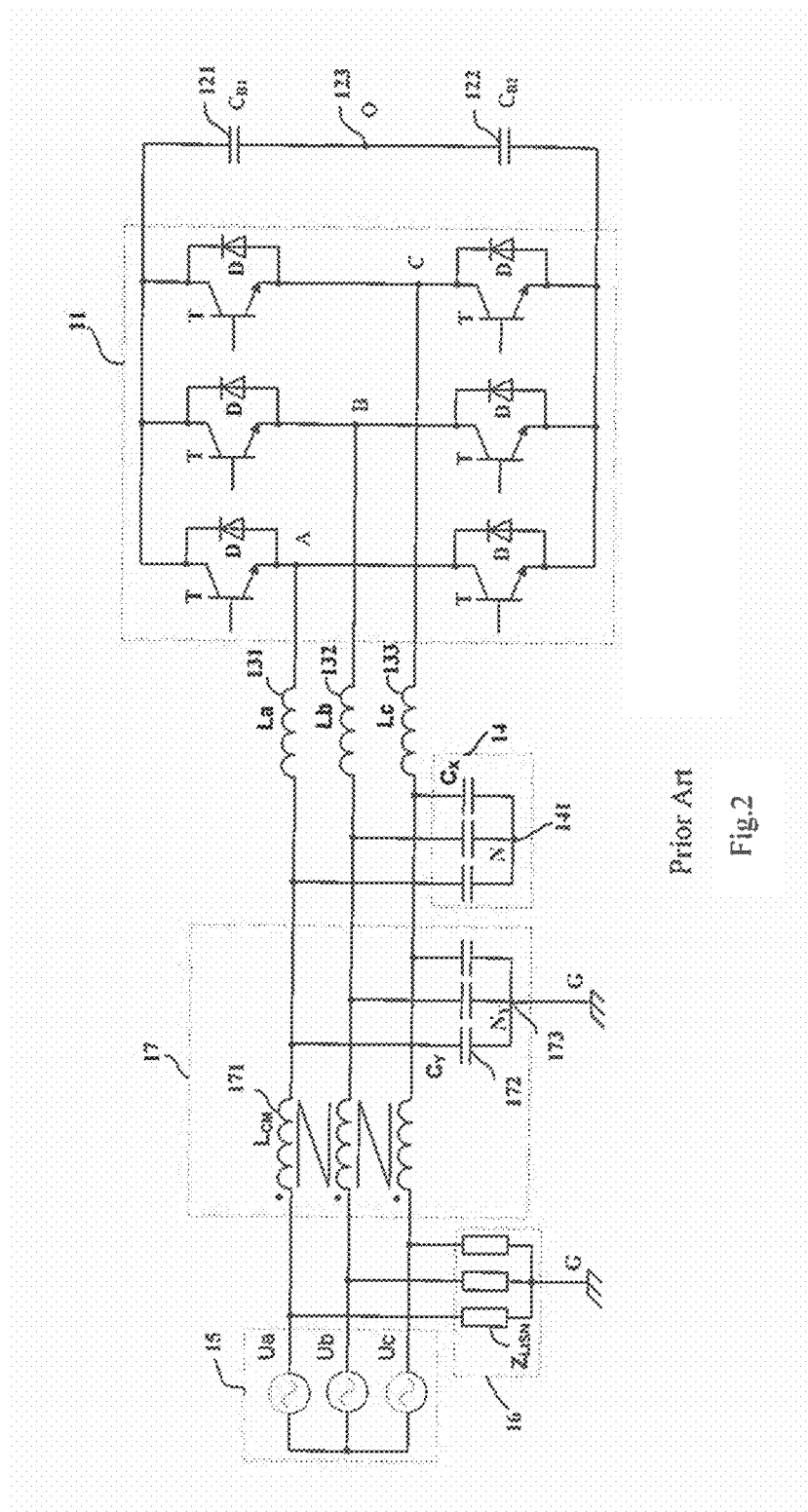
FIG. 2 illustratively shows a circuit diagram of a solution for suppressing common mode noise in conventional technique.
Figure 12B:
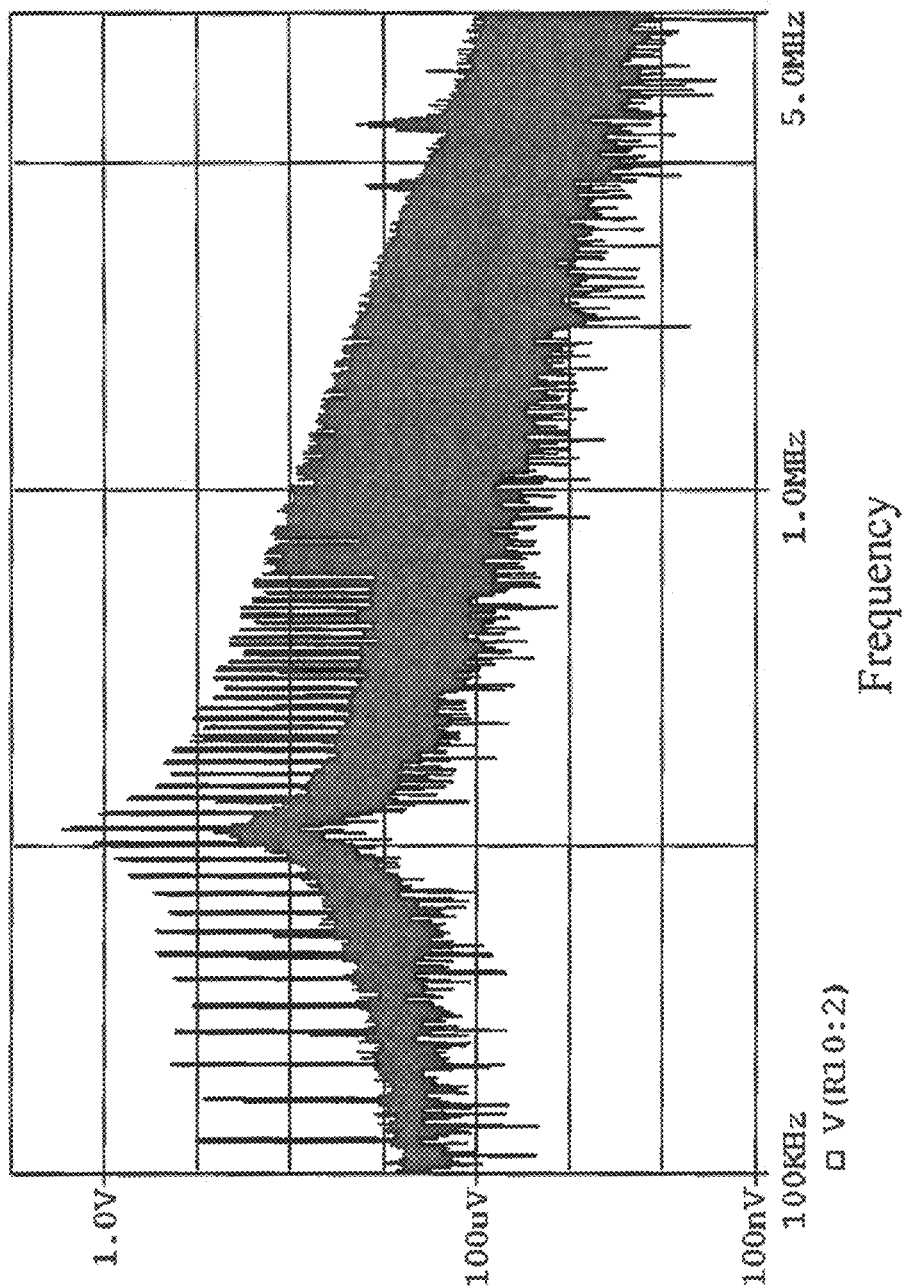
FIG. 12B to FIG. 12D illustratively show circuit simulation results of original common mode noise of a power converter according to the conventional technique shown in FIG. 1, common mode noise after being suppressed according to the conventional technique shown in FIG. 3, and using a common noise suppressing solution of the present application shown in FIG. 9A, respectively.
Figure 12C:
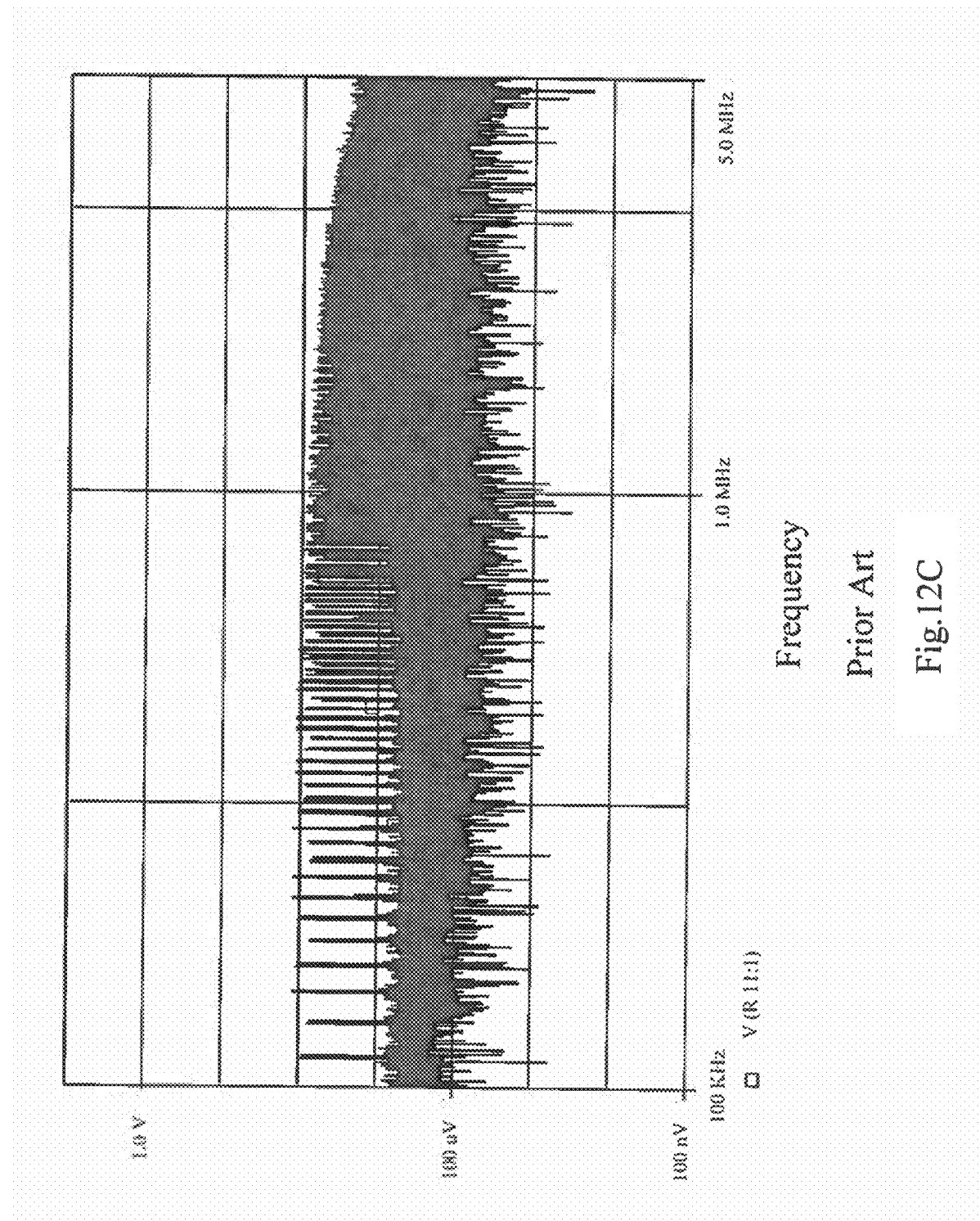
Figure 12D:
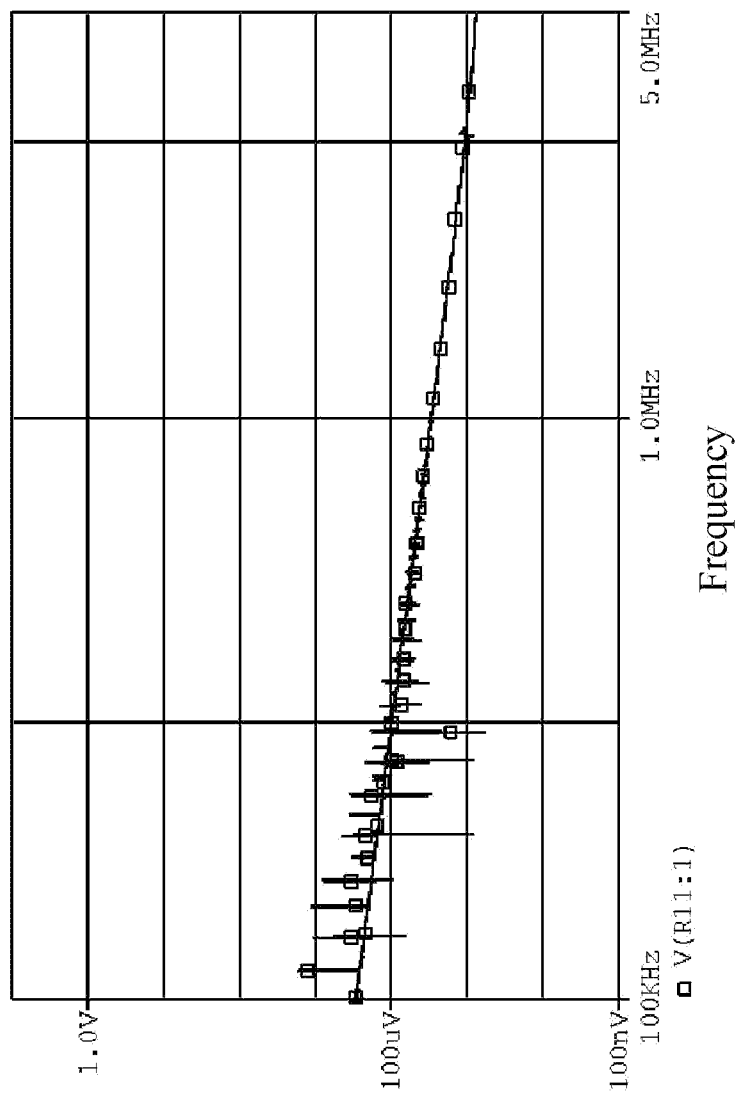

FIG. 12B illustratively shows a simulation result of common mode noise according to a circuit of a conventional power converter shown in FIG. 1. FIG. 12C illustrates a simulation result of common mode noise according to a circuit of a power converter in conventional techniques that provides noise suppression functionalities as shown in FIG. 3. FIG. 12D illustrates a simulation result of common mode noise according to the power conversion system of the present application as exemplified in FIG. 9A, wherein the balancing impedance $Z_0$ is a single inductor. The three-phase bridge arms of the power conversion units in the circuits on which the three simulation results of common mode noise are based are symmetrical, the parameters of the circuits on which the simulation are based are the same, and for example, the distributed capacitance $C_1$ between each midpoint of the bridge arms and the ground is 20 picofarads, the distributed capacitance $C_0$ between the midpoint of the DC bus and the ground is 1 nanofarad, the filter inductor L is 700 microhenries, and the impedance $Z_{LISN}$ in the Line Impedance Stabilization Network 16 is 50 ohms. The simulation results with respect to the three circuits in FIG. 12B to FIG. 12D are basically the same as the simulation results with respect to three equivalent model circuits of common mode noise shown in FIG. 12A. By comparing FIG. 12B to FIG. 12D, it is easy to find out that the simulation result of common mode noise for the technical solution of the present application is superior to the results for the other two technical solutions.

The solution for suppressing common mode noise according to the present application can be applied in a variety of power systems.

Figure 13A:
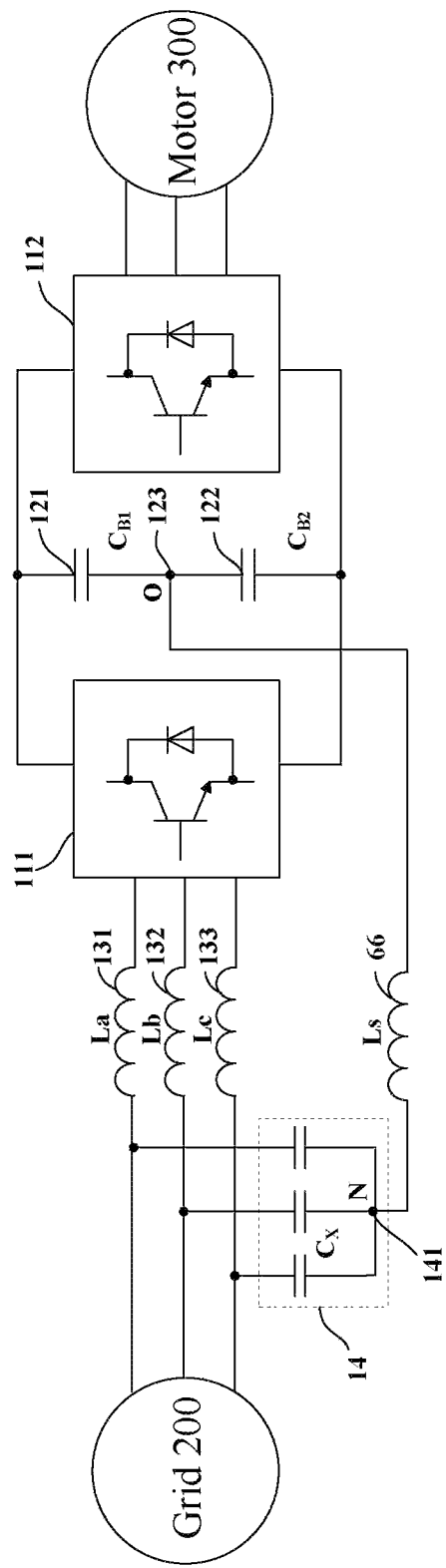
FIG. 13A illustratively shows a circuit diagram of an application embodiment of a power conversion apparatus with low common mode noise according to the present application.

FIG. 13A illustratively shows an embodiment of an application of a power conversion apparatus with low common mode noise. This application in the embodiment can be a variable-frequency drive (VFD) system. A motor 300 is an electrical motor, and electrical energy flows from the grid 200 into the motor 300 and is converted into mechanical energy. The variable-frequency drive system can be a variable-frequency drive system with active front end (AFE). The variable-frequency drive system includes a first power conversion unit 111 and the second power conversion unit 112. The first power conversion unit 111 is a rectifier unit, for example, it can be a power conversion unit 11 consisting of three bridge arms as shown in FIG. 9A, for converting an AC voltage into a DC voltage. The second power conversion unit 112 is an inverter unit for driving the motor 300.

The application example shown in FIG. 13A can also be a wind power generation system, and when it works as a wind power generation system, the motor 300 can be a generator such as a wind powered generator. The motor 300 makes use of other energy to produce electrical energy and delivers it to the grid 200, i.e. the electrical energy flows from the motor 300 into the grid 200. In this case, the first power conversion unit 111 is an inverter unit which converts a DC voltage into an AC voltage, and the second power conversion unit 112 is a rectifier unit which converts an AC voltage generated by the motor 300 into the DC voltage and delivers it to the first power conversion unit 111, and the first power conversion unit 111 converts the received DC voltage into an AC voltage that can be delivered to the grid 200.

The principle of suppressing common mode noise applied for the embodiment shown in FIG. 13A has been described in the above content, therefore it will not be elaborated repeatedly.

Figure 13B:
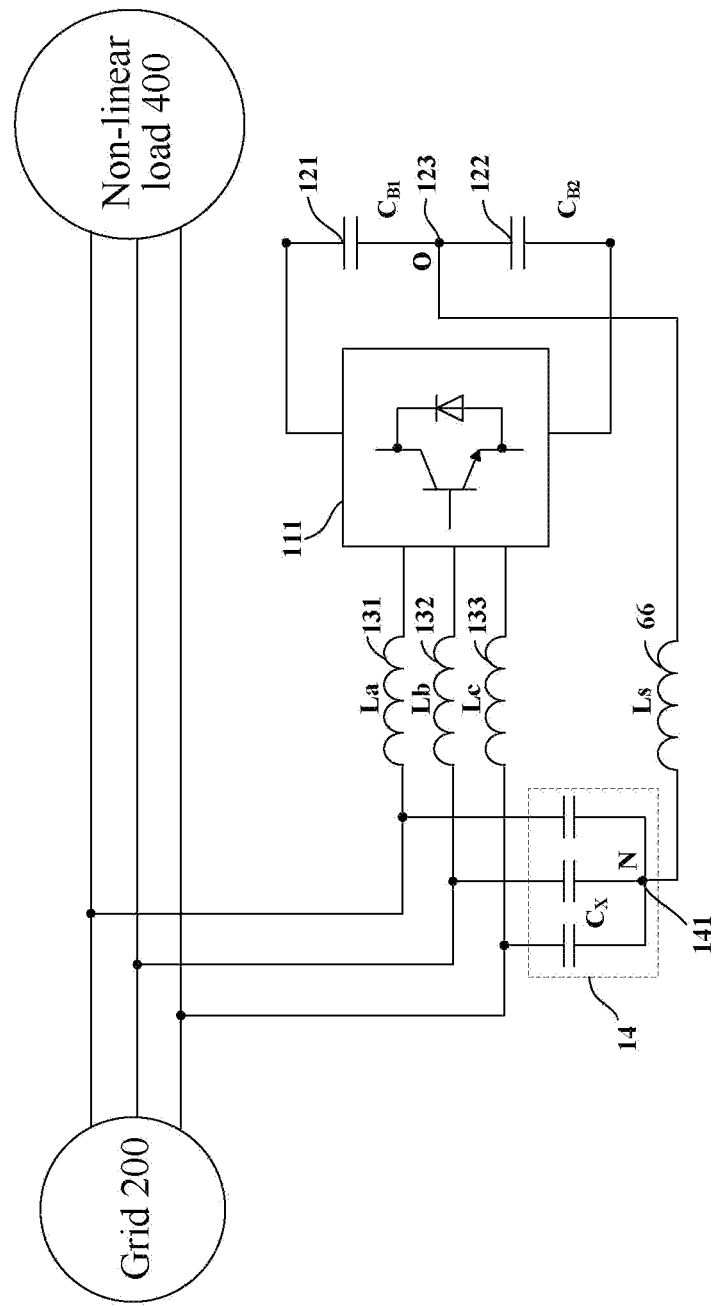
FIG. 13B illustratively shows a circuit diagram of another application embodiment of a power conversion apparatus with low common mode noise according to the present application.

FIG. 13B illustratively shows a circuit diagram of an embodiment of another application of a power conversion apparatus with low common mode noise according to the present application. The power conversion apparatus can also be applied in power quality devices such as active power filters (APF) or reactive power compensation devices. A power quality device usually plays a role in compensating for harmonics and/or reactive power caused by non-linear loads. A power quality device also plays a role in compensating for harmonics and reactive power caused by non-linear loads. As shown in FIG. 13B, the power quality device includes an inverter circuit unit 111, in order to avoid pollution caused by a non-linear load 400 to the AC source such as the grid 200. The output of the inverter circuit unit 111 can be used to compensate for at least one of harmonics and reactive power caused by the non-linear loads 400. Hence, the power conversion unit in the present embodiment works as an inverter circuit unit 111, so . . . .

Figure 13C:
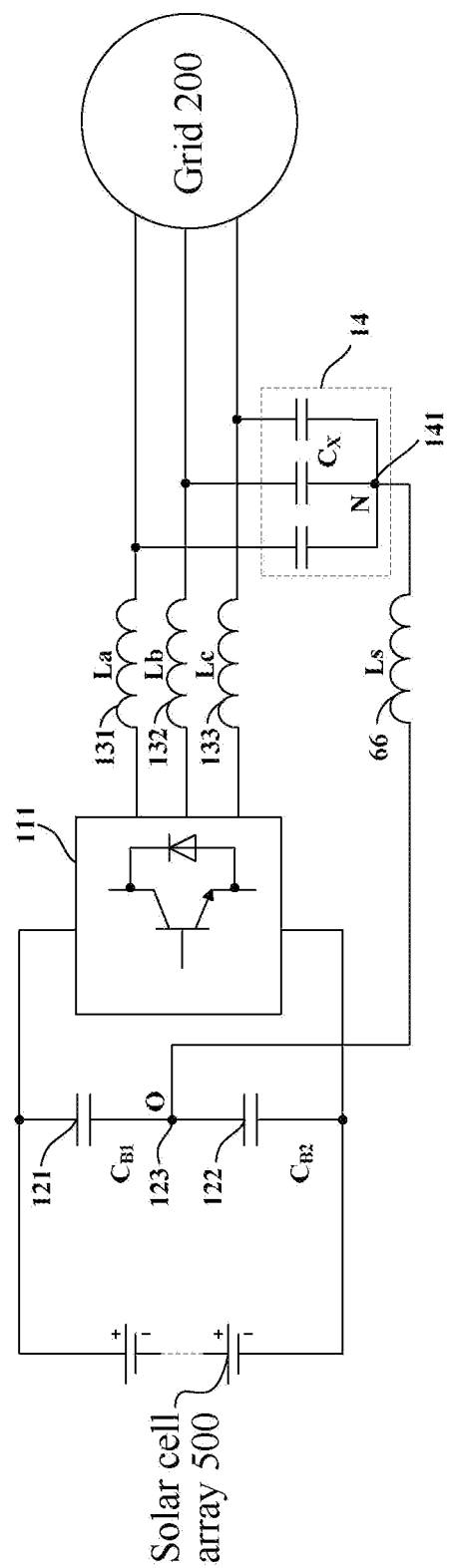
FIG. 13C illustratively shows a circuit diagram of further another application embodiment of a power conversion apparatus with low common mode noise according to the present application.

FIG. 13C illustratively shows a circuit diagram of an embodiment of a power conversion apparatus with low common mode noise applied to an energy control system. Specifically, the embodiment is an application in a solar grid-connected inverter system. The solar cell array 500 is used for generating a DC voltage, and supplies the generated DC voltage to a DC terminal of the inverter circuit unit 111 of the power conversion apparatus. The DC voltage is converted into a three-phase AC voltage and delivered into the grid 200 by the inverter circuit unit 111. In this embodiment, the power conversion unit also works as an inverter circuit unit 111, so that common mode noise generated in the inverter circuit unit 111 is also suppressed to a certain degree, and the principle for suppressing common mode noise has been described in the above content, therefore it will not be elaborated redundantly.

The power conversion apparatus for suppressing common mode noise according to the present application is able to suppress effectively the propagation of common mode noise of power conversion apparatuses to the grid, and refrained from the required large volume, high cost and difficulties in design due to the use of common mode filter inductor with large capacity in the prior art.

Although the present application has been described with reference to typical embodiments, it shall be understood that the terms used in the description are illustrative and exemplary, rather than limiting terms. Since the present application can be implemented specifically in various forms, it shall be understood that the above embodiments are not limited to any aforementioned details, but shall be construed broadly within the scope as defined in the appended claims, therefore all changes and modifications falling within the range of appended claims or the equivalents thereof shall be covered by the appended claims.

What is claimed is:

1. A power conversion apparatus with low common mode noise, comprising:
    a power conversion circuit, the power conversion circuit comprising:
        an AC source;
        a power conversion unit with DC terminals and AC terminals; and
        a filter inductor unit, including the same number of filter inductor sub-units as that of terminals of the AC source, first terminals of the filter inductor sub-units being connected to the terminals of the AC source in one-to-one correspondence, and second terminals of the filter inductor sub-units being connected to the AC terminals of the power conversion unit in one-to-one correspondence; and a common mode noise suppression circuit, the common mode noise suppression circuit comprising:
   a capacitive impedance network, including the same number of capacitive branches as that of the filter inductor sub-units, first terminals and second terminals;
   an impedance balancing network, including first terminals and second terminals;
   wherein the first terminals of the capacitive branches are connected to the first terminals of the filter inductor sub-units in one-to-one correspondence, the second terminals of the capacitive branches are connected to the first terminals of impedance balancing network, and the second terminals of the impedance balancing network are connected to the DC terminals of the power conversion unit;
   the impedance balancing network and the filter inductor unit have the same impedance characteristics in a preset electromagnetic interference band; and
   an impedance of the impedance balancing network meeting:

$$\frac{Z_{Lx}}{-Z_0 // Z_{Li}} = \frac{Z_{cx}}{Z_{c0} // Z_{ci}}$$

wherein $Z_0$ is an impedance of the impedance balancing network, $Z_{Li}$ is an impedance of the filter inductor sub-unit that is equivalent to be in parallel with $Z_0$, $Z_{Lx}$ is an impedance of the filter inductor sub-unit that is equivalent to be in series with $Z_0$; $Z_{cx}$ is an impedance between the ground and the AC terminal of the power conversion unit connected by the filter inductor sub-unit to which $Z_{Lx}$ corresponds, $Z_{c0}$ is an impedance between the ground and the DC terminal of the power conversion unit connected by the impedance balancing network, and $Z_{ci}$ is an impedance between the ground and other AC terminals of the power conversion unit that are equivalent to be in parallel with $Z_{c0}$.

2. The power conversion apparatus according to claim 1, wherein the power conversion unit is a three-phase power conversion unit or a single-phase power conversion unit; correspondingly the AC source is a three-phase AC source or a single-phase AC source.

3. The power conversion apparatus according to claim 1, wherein the filter inductor sub-unit is an inductor element.

4. The power conversion apparatus according to claim 1, wherein the capacitive branch is a capacitive element, or a capacitive element connected in series with a resistor.

5. The power conversion apparatus according to claim 1, wherein each of the capacitive branches has the same structure and the same device parameters; each of the filter sub-units has the same structure and the same device parameters; and the power conversion unit is of symmetrical structure, and is of the same device parameters.

6. The power conversion apparatus according to claim 1, wherein the impedance balancing network is an inductive branch, the inductive branch comprises at least one inductor.

7. The power conversion apparatus according to claim 6, wherein the inductive branch further comprises a damping resistor and a capacitor, the damping resistor, the capacitor and the inductor are connected in series to each other.

8. The power conversion apparatus according to claim 6, wherein the inductor is a single inductor; a terminal of the single inductor acts as the first terminal of the impedance balancing network.

9. The power conversion apparatus according to claim 6, wherein the inductor is a non-coupled inductor network or a coupled inductor network; the non-coupled inductor network comprises at least two non-coupled inductors, the coupled inductor network comprises at least two coupled windings, a terminal of each of the two non-coupled inductors or coupled windings is connected into a common node which acts as the second terminal of the impedance balancing network, the other terminal of each of the two non-coupled inductors or coupled windings acts as the first terminal of the impedance balancing network.

10. The power conversion apparatus according to claim 1, wherein the DC terminals of the power conversion unit comprises two DC leads between which a DC voltage exists.

11. The power conversion apparatus according to claim 10, wherein the DC terminals of the power conversion unit further comprises two bus capacitors in series, the two bus capacitors in series are connected across between the two DC leads, and the common node of the two bus capacitors in series forms a midpoint of the DC terminals.

12. The power conversion apparatus according to claim 1, wherein the power conversion unit is a two-level rectifier or the inverter circuit, or a multi-level rectifier or inverter circuit.

13. An energy conversion system, comprising:
   an AC source;
   a first power conversion unit with DC terminals and AC terminals;
   a second power conversion unit with DC terminals and AC terminals;
   a motor;
   a common mode noise suppression circuit;
   wherein the AC source is coupled to the AC terminals of the first power conversion unit, the DC terminals of the first power conversion unit are coupled to the DC terminals of the second power conversion unit, the AC terminals of the second power conversion unit are electrically coupled to the motor, and the common mode noise suppression circuit is coupled to the first power conversion unit;
   a filter inductor unit, including the same number of filter inductor a filter inductor unit, including the same number of filter inductor sub-units as that of terminals of the AC source, first terminals of the filter inductor sub-units being connected to the terminals of the AC source in one-to-one correspondence, and second terminals of the filter inductor sub-units being connected to the AC terminals of the power conversion unit in one-to-one correspondence; and
   the common mode noise suppression circuit comprising:
      a capacitive impedance network, including the same number of capacitive branches as that of the filter inductor sub-units, first terminals and second terminals;
      an impedance balancing network, including first terminals and second terminals;
      wherein the first terminals of the capacitive branches are connected to terminals of the filter inductor sub-units in one-to-one correspondence, the second terminals of the capacitive branches are connected to the first terminals of impedance balancing network, and the second terminals of the impedance balancing network are connected to the DC terminals of the first power conversion unit;

the impedance balancing network and the filter inductor unit have the same impedance characteristics in a preset electromagnetic interference band; and an impedance of the impedance balancing network meeting:

$$\frac{Z_{Lx}}{-Z_0 \,//\, Z_{Li}} = \frac{Z_{cx}}{Z_{c0} \,//\, Z_{ci}}$$

wherein $Z_0$ is an impedance of the impedance balancing network, $Z_{Li}$ is an impedance of the filter inductor sub-unit that is equivalent to be in parallel with $Z_0$, $Z_{Lx}$ is an impedance of the filter inductor sub-unit that is equivalent to be in series with $Z_0$; $Z_{cx}$ is an impedance between the ground and the AC terminal of the power conversion unit connected by the filter inductor sub-unit to which $Z_{Lx}$ corresponds, $Z_{c0}$ is an impedance between the ground and the DC terminal of the power conversion unit connected by the impedance balancing network, and $Z_{ci}$ is an impedance between the ground and other AC terminals of the power conversion unit that are equivalent to be in parallel with $Z_{c0}$.

14. The energy conversion system according to claim 13, wherein the motor is a wind-powered generator.

15. A power quality device, comprising:

an inverter circuit unit having DC terminals and AC terminals, wherein the inverter circuit unit is connected to an AC source, for compensating at least one of the reactive power and harmonics generated by a non-linear load that is electrically connected to the AC source;

a filter inductor unit, including the same number filter inductor a filter inductor unit, including the same number of filter inductor sub-units as that of terminals of the AC source first terminals of the filter inductor sub-units being connected to the terminals of the AC source in one-to-one correspondence, and second terminals of the filter inductor sub-units being connected to the AC terminals of the power conversion unit in one-to-one correspondence; and a common mode noise suppression circuit, comprising:

a capacitive impedance network, including the same number of capacitive branches as that of the filter inductor sub-units, first terminals and second terminals;

an impedance balancing network, including first terminals and second terminals;

wherein the first terminals of the capacitive branches are connected to the first terminals of the filter inductor sub-units in one-to-one correspondence, the second terminals of the capacitive branches are connected to the first terminals of impedance balancing network, and the second terminals of the impedance balancing network are connected to the DC terminals of the inverter circuit unit;

the impedance balancing network and the filter inductor unit have the same impedance characteristics in a preset electromagnetic interference band; and an impedance of the impedance balancing network meeting:

$$\frac{Z_{Lx}}{-Z_0 \,//\, Z_{Li}} = \frac{Z_{cx}}{Z_{c0} \,//\, Z_{ci}}$$

wherein $Z_0$ is an impedance of the impedance balancing network, $Z_{Li}$ is an impedance of the filter inductor sub-unit that is equivalent to be in parallel with $Z_0$, $Z_{Lx}$ is an impedance of the filter inductor sub-unit that is equivalent to be in series with $Z_0$; $Z_{cx}$ is an impedance between the ground and the AC terminal of the power conversion unit connected by the filter inductor sub-unit to which $Z_{Lx}$ corresponds, $Z_{c0}$ is an impedance between the ground and the DC terminal of the power conversion unit connected by the impedance balancing network, and $Z_{ci}$ is an impedance between the ground and other AC terminals of the power conversion unit that are equivalent to be in parallel with $Z_{c0}$.

16. An energy control system, comprising:

a DC source;

an AC source;

an inverter circuit unit with DC terminals and AC terminals;

a filter inductor unit, including the same number of filter inductor sub-units as that of terminals of the AC source, first terminals of the tilter inductor sub-units being connected to the terminals of the AC source in one-to-one correspondence, and second terminals of the filter inductor sub-units being connected to the AC terminals of the power conversion unit in one-to-one correspondence; and a common mode noise suppression circuit, comprising:

a capacitive impedance network, including the same number of capacitive branches as that of the tilter inductor sub-units, first terminals and second terminals;

an impedance balancing network, including first terminals and second terminals;

wherein the first terminals of the capacitive branches are connected to the first terminals of the filter inductor sub-units in one-to-one correspondence, the second terminals of the capacitive branches are connected to the first terminals of impedance balancing network, and the DC terminals of the inverter circuit unit are connected to the DC source;

the impedance balancing network and the filter inductor unit have the same impedance characteristics in a preset electromagnetic interference band; and an impedance of the impedance balancing network meeting:

$$\frac{Z_{Lx}}{-Z_0 \,//\, Z_{Li}} = \frac{Z_{cx}}{Z_{c0} \,//\, Z_{ci}}$$

wherein $Z_0$ is an impedance of the impedance balancing network, $Z_{Li}$ is an impedance of the filter inductor sub-unit that is equivalent to be in parallel with $Z_0$, $Z_{Lx}$ is an impedance of the filter inductor sub-unit that is equivalent to be in series with $Z_0$; $Z_{cx}$ is an impedance between the ground and the AC terminal of the power conversion unit connected by the filter inductor sub-unit to which $Z_{Lx}$ corresponds, $Z_{c0}$ is an impedance between the ground and the DC terminal of the power conversion unit connected by the impedance balancing network, and $Z_{ci}$ is an impedance between the ground and other AC terminals of the power conversion unit that are equivalent to be in parallel with $Z_{c0}$.

* * * * *